(12) United States Patent
Maeda et al.

(10) Patent No.: US 7,941,170 B2
(45) Date of Patent: May 10, 2011

(54) WIRELESS TRANSMITTER, WIRELESS RECEIVER, WIRELESS COMMUNICATION SYSTEM, AND WIRELESS SIGNAL CONTROL METHOD

(75) Inventors: Koji Maeda, Yokosuka (JP); Takahiro Asai, Yokosuka (JP); Anass Benjebbour, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 937 days.

(21) Appl. No.: 11/828,862

(22) Filed: Jul. 26, 2007

(65) Prior Publication Data

US 2008/0026704 A1 Jan. 31, 2008

(30) Foreign Application Priority Data

Jul. 31, 2006 (JP) .............................. P2006-208679
Oct. 20, 2006 (JP) .............................. P2006-286741

(51) Int. Cl.
  *H04B 7/00* (2006.01)
  *H04W 72/00* (2009.01)
(52) U.S. Cl. .................................... 455/514; 455/452.2
(58) Field of Classification Search .................. 455/450, 455/451, 452.1, 500, 509, 514, 517, 452.2, 455/3.01; 370/329, 338
See application file for complete search history.

(56) References Cited

U.S. PATENT DOCUMENTS

| 5,048,015 | A | 9/1991 | Zilberfarb |
| 6,356,607 | B1 | 3/2002 | Scott et al. |
| 6,754,195 | B2 | 6/2004 | Webster et al. |
| 6,888,790 | B2 | 5/2005 | Kilani |
| 6,934,299 | B2 | 8/2005 | Kaatz |
| 7,006,587 | B1 | 2/2006 | Lewis et al. |
| 2008/0058975 | A1* | 3/2008 | Visuri et al. .................. 700/100 |
| 2009/0003414 | A1* | 1/2009 | Yellin ........................... 375/147 |

FOREIGN PATENT DOCUMENTS

| EP | 1 662 677 A1 | 5/2006 |
| JP | 4-233344 | 8/1992 |
| JP | 5-503993 | 6/1993 |
| JP | 2006-074244 | 3/2006 |
| JP | 2007-288624 | 11/2007 |
| KR | 20-0258299 | 12/2001 |
| TW | 588524 | 5/2004 |
| WO | WO 91/11037 | 7/1991 |

OTHER PUBLICATIONS

Menguec Oener, et al., "Air Interface Recognition For a Software Radio System Exploiting Cyclostationarity", Proceedings of PIMRC, IEEE, Sep. 5, 2004, pp. 1947 1951.

(Continued)

*Primary Examiner* — Nguyen Vo
(74) *Attorney, Agent, or Firm* — Oblon, Spivak, McClelland, Maier & Neustadt, L.L.P.

(57) ABSTRACT

A wireless transmitter comprises ID signal storage module for storing an ID signal that identifies a group to which a data signal to be transmitted belongs and provides, for each group, second or higher-order statistic properties unique to each group; modulator for modulating the data signal; wireless signal ID assignment module for associating the modulated signal thus modulated with the stored ID signal and for generating a signal to be transmitted, by assigning second or higher-order statistic properties that correspond with the ID signal to the modulated signal that is associated with the ID signal; and wireless signal transmission module for wirelessly transmitting the signal thus generated.

11 Claims, 14 Drawing Sheets

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 8: Medium Access Control (MAC) Quality of Service Enhancements", IEEE Std 802.11e™-2005, The Institute of Electrical and Electronics Engineers, IEEE Computer Society, Nov. 11, 2005, 211 Pages.

"Overview of ARIB Standard (RCR STD-28)", Association of Radio Industries and Businesses, 1993, 18 Pages.

"Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications; High-speed Physical Layer in the 5 GHz Band", Adopted by the ISO/IEC and redesignated as ISO/IEC 8802-11:1999/Amd 1:2000(E), IEEE Std 802. 11a-1999 (Reaffirmed Jun. 12, 2003), IEEE-SA Standards Board, The Institute of Electrical and Electronics Engineers, 1999, 91 Pages.

Office Action issued Feb. 11, 2011, in Taiwan Patent Application No. 096127773.

* cited by examiner

*Fig.4*

| | FEATURE QUANTITY OF SECOND OR HIGHER-ORDER STATISTIC PROPERTIES | ID SIGNAL WAVEFORM |
|---|---|---|
| GROUP 1 | $R_{x1}(a, \tau)$ | $x_1(t)$ |
| GROUP 2 | $R_{x2}(a, \tau)$ | $x_2(t)$ |
| GROUP 3 | $R_{x3}(a, \tau)$ | $x_3(t)$ |

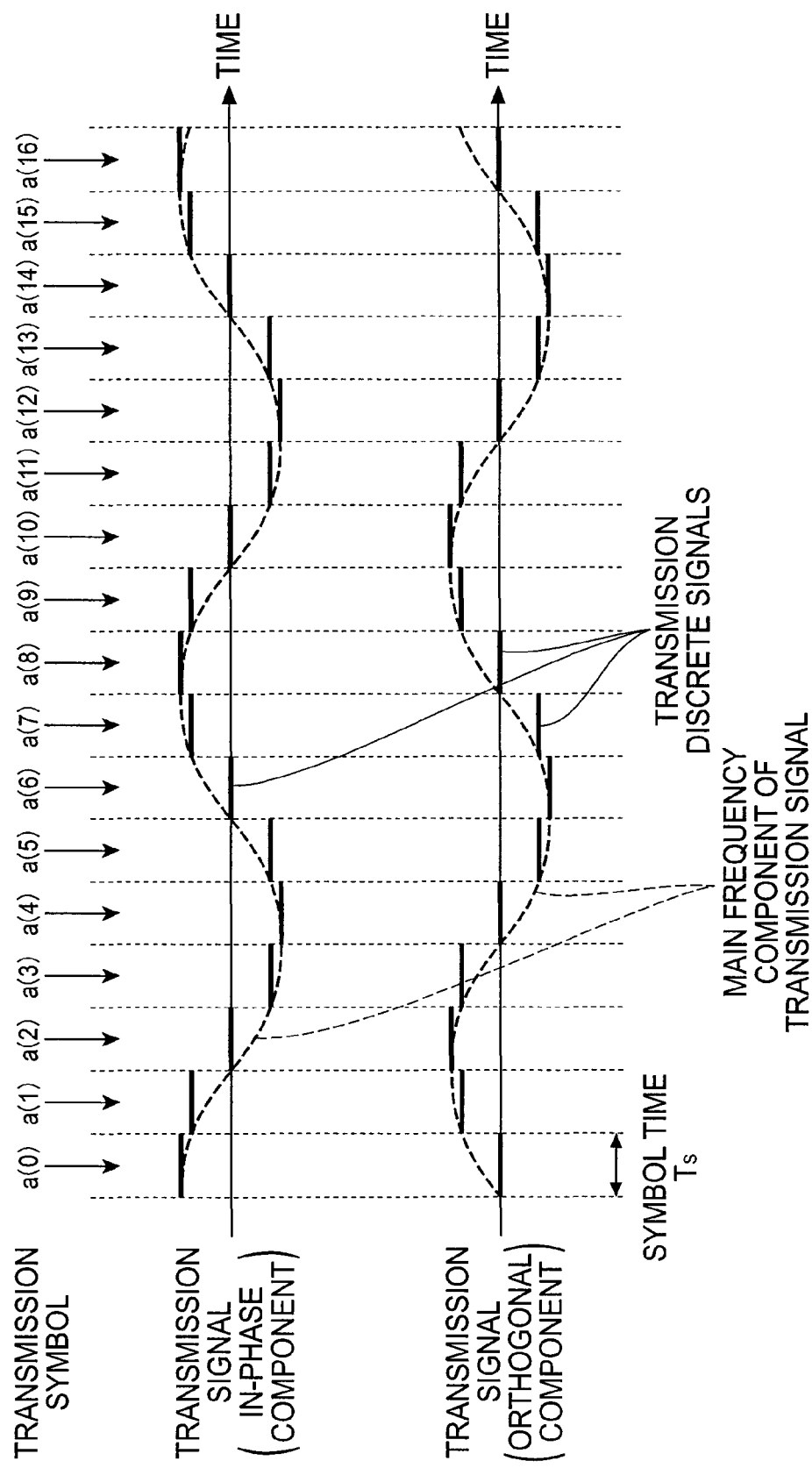

WIRELESS TRANSMITTER, WIRELESS RECEIVER, WIRELESS COMMUNICATION SYSTEM, AND WIRELESS SIGNAL CONTROL METHOD

BACKGROUND OF THE INVENTION

1. Field of the Invention

The present invention relates to a wireless transmitter, a wireless receiver, and a wireless communication system that exist in an environment where a plurality of user groups or a plurality of service providers (these will be referred to by the general term 'a plurality of groups' hereinbelow) perform wireless communications simultaneously by using a common frequency band, and the present invention relates to a wireless signal control method that is executed by the wireless transmitter, the wireless receiver, and the wireless communication system.

2. Related Background Art

Communication by a plurality of groups using a common frequency band has been examined as a possible method for equitably utilizing wireless resources. An essential condition for a plurality of groups commonly using the same frequency is that they perform communications equitably without obstructing the communications of other groups.

A wireless LAN system may be given as an example of conventional frequency sharing technology. In the case of a wireless LAN system, a plurality of wireless stations autonomously implement the co-existence of their wireless signals over the same frequency in an environment where a plurality of wireless stations coexist by performing carrier sensing to judge whether a predetermined frequency is being used by another station in the vicinity and transmitting a signal when the predetermined frequency is not being used in the vicinity (CSMA/CA). In CSMA/CA, once the busy state where a frequency is being used ends, the wireless station transmits a signal after waiting for a time obtained by adding a random amount of time to a fixed time interval. Because each user starts communicating after waiting for a time obtained by adding a random amount of time in this manner, the probability of each user being able to perform communication is equitable, and thus the fairness of communication between users can be maintained (see "'IEEE Std 802.11a-1999" The Institute of Electrical and Electronics Engineers, 1999').

As a wireless system where a plurality of service providers commonly use a plurality of wireless channels that exist in the same frequency band, there exists PHS. With PHS, a plurality of service providers commonly use a plurality of prepared carriers for communication. PHS is used with a base station performing call control for each service provider by means of a control carrier that is individually prepared for each service provider and selecting the carrier for communication to be used from the unused carriers for communication. Regarding the selected common carrier for communication, fairness between users is maintained by means of time division multiple access (TDMA), in which each user is permitted to use the frequency for transmission of a data signal only during the assigned time slot. The time slot is obtained by dividing a certain time period in advance (See "ARIB RCR STD-28" Association of Radio Industries and Businesses, 1993).

However, for the wireless LAN system, it is possible to obtain fairness between users by means of CSMA/CA, but in the case where there is a user that breaches etiquette and continues to use the wireless resources, it becomes impossible for other users to utilize that frequency band. Also, in an environment where a plurality of groups coexists, there is a problem that a group with few users has a diminished probability of being able to establish communication compared to a group with a large number of users, and, hence, fairness between groups cannot be guaranteed. For this reason, in a wireless LAN system, it becomes important to assign IDs that serve to discriminate between users occupying the frequency or the groups to which the users belong, to the wireless signals in order to control etiquette breaches and ensure fairness between service providers.

Furthermore, in the case of the PHS, in addition to the above-mentioned problems, because control of communication is performed by preparing an exclusive control carrier for a plurality of groups, it becomes difficult to assign each group a control carrier as the number of groups increases, because the frequency resources are finite. For this reason, it becomes important to achieve a technology that assigns the ID of the groups to which each wireless signal belongs and classifies the group that the received wireless signal belongs to without requesting excessive frequency resources.

When it is possible to discriminate between groups, for example, in the case of a wireless LAN system using CSMA/CA, it also becomes possible to control the fairness between groups by controlling the random times on the basis of statistic quantities (for example, the proportion of how many times each group delivers a signal in a predetermined time interval before a signal is sent, or the like) obtained from the results of group discrimination (see "IEEE Std 802.11e-2005" The Institute of Electrical and Electronics Engineers, 2005).

As per a communication system such as PHS that uses TDMA/TDD, by controlling the transmission slot and frequency allocation opportunity based on the statistic quantities obtained from the group discrimination result, the fairness between groups can be controlled.

In a wireless LAN system, in order to assign the ID of the group, to which a wireless signal belongs, to the wireless signal, for example, as shown in FIG. 1, a wireless transmitter 11 transmits a wireless signal 13 after inserting an ID (wireless signal ID: MAC address, for example), which serves to identify the group to which the wireless signal 13 belongs, into the wireless signal 13. At the wireless receiver 12, the wireless signal 13 is divided into a wireless signal ID and a data signal by a signal divider 14, and the wireless signal ID is demodulated. After that, at an ID discriminator 15, the group, to which the received signal 13 belongs, is discriminated based on the demodulated wireless signal ID.

SUMMARY OF THE INVENTION

However, using the above method, the wireless device that receives a wireless signal is required to demodulate the wireless signal ID and discriminate the group to which the wireless signal belongs for every received wireless signal, even if the wireless signal is transmitted for the other wireless devices. Hence, there is a problem that, from the perspective of the amount of processing, there is a large load on the wireless device on the reception side of the wireless signal. In cases where a 802.11a system-based wireless LAN system is employed, for example, in order to discriminate the group, it is necessary to perform demodulation using a FFT with respect to the data part of the wireless signal and error correction decoding after establishing symbol timing synchronization and establishing carrier frequency synchronization using a preamble with respect to the received wireless signal. In order to discriminate a group in this manner, it is necessary to execute serial data demodulation processing.

Therefore, the present invention was conceived in view of solving the above problems and an object of the present invention is to provide a wireless transmitter, a wireless receiver, a wireless communication system, and a wireless signal control method that makes it possible to discriminate the group to which the signal belongs without performing complex data demodulation processing with respect to a received signal, in an environment where a plurality of groups coexist.

In order to achieve the above object, a wireless transmitter according to the present invention comprises ID signal storage module for storing an ID signal that identifies a group to which a data signal to be transmitted belongs and provides, for each group, second or higher-order statistic properties unique to each group; modulator for modulating the data signal; wireless signal ID assignment module for associating the modulated signal that is modulated by the modulator with the ID signal that is stored in the ID signal storage module, and for generating a signal to be transmitted, by assigning second or higher-order statistic properties that correspond with the ID signal to the modulated signal that is associated with the ID signal; and wireless signal transmission module for wirelessly transmitting the signal that is generated by the wireless signal ID assignment module. As a result of this constitution, second or higher-order statistic properties that are unique to the group to which the signal to be transmitted belongs can be added and an ID for each group can be assigned.

Further, in the wireless transmitter, the wireless signal ID assignment module is desirably constituted to assign the second or higher-order statistic properties corresponding with the ID signal to the modulated signal by adding the ID signal to the modulated signal. In this case, by adding the modulated signal obtained through modulation of the data signal to the ID signal, the features of the second or higher-order statistic properties corresponding with the ID signal can be observed in the signal obtained after the addition without correlation with those of the modulated signal. Hence, by extracting the second or higher-order statistic properties, the group to which the signal to be transmitted belongs can be discriminated.

In the wireless transmitter, the wireless signal ID assignment module is desirably constituted to assign the second or higher-order statistic properties corresponding with the ID signal to the modulated signal by multiplying the ID signal by the modulated signal. In this case, it is possible to add second or higher-order statistic properties that do not appear only for a data signal. Hence, by observing the second or higher-order statistic properties, the group to which the signal to be transmitted belongs can be discriminated.

In addition, the wireless transmitter is a wireless transmitter that transmits a signal by means of multicarrier transmission that uses a plurality of subcarriers; the ID signal storage module stores an ID signal for which the signals to be transmitted on each subcarrier is determined so that the second or higher-order statistic properties unique to the group appear in accordance with the group to which the transmitted data signal belongs; and the wireless signal ID assignment module generates the signal to be transmitted by setting the signals to be transmitted on each subcarrier, on the basis of the ID signal stored in the ID signal storage module. In this case, the second or higher-order statistic properties, that can be discriminated highly accurately, can be assigned to the signal to be transmitted of each group by modifying the content of the signal to be transmitted by utilizing the characteristics of multicarrier transmission (that is, by setting the signal to be transmitted on each subcarrier based on the ID signal).

In addition, the wireless transmitter is a wireless transmitter that transmits a signal by means of multicarrier transmission using a plurality of subcarriers; the ID signal storage module is desirably constituted to store, as the ID signal, a sine wave or transmission symbols which are obtained by sampling and quantizing a signal of the sine wave, of a predetermined frequency which corresponds to the group to which the data signal to be transmitted belongs; and the wireless signal ID assignment module is desirably constituted to generate the signal to be transmitted by making settings so that the sine wave or the transmission symbols stored in the ID signal storage module are transmitted by the subcarrier used for the ID signal transmission. In this case, there is a concentration of signal energy in a predetermined frequency component in the subcarrier. By concentrating the signal energy on a predetermined frequency component in this manner, second or higher-order statistic properties that are unique to the group to which the received signal belongs can be made to appear prominently and highly accurate ID detection can be performed.

In addition, the wireless transmitter is a wireless transmitter that transmits a signal by means of multicarrier transmission that employs a plurality of subcarriers; the ID signal storage module is desirably constituted to store an ID signal for which the subcarrier used for communication is determined from among all the subcarriers in accordance with the group to which the data signal to be transmitted belongs; and the wireless signal ID assignment module is desirably constituted to generate the signal to be transmitted that uses only a predetermined subcarrier determined by the ID signal stored in the ID signal storage module. In this case, a frequency autocorrelation peak exists in the frequency autocorrelation determined by multiplying selected subcarriers and, conversely, the frequency autocorrelation between the selected subcarriers and the subcarriers that are not selected is zero. Hence, ID detection can be performed by using only frequency autocorrelation peak detection in the wireless receiver.

Further, in the wireless transmitter, the ID signal storage module is desirably constituted to store an ID signal that is determined so that a change that is unique to the group to which the data signal belongs arises as a result of the delay time in the second or higher-order statistic properties obtained from the data signal to be transmitted and a data signal to be transmitted with a predetermined delay time; and the wireless signal ID assignment module is desirably constituted to generate the signal to be transmitted by assigning second or higher-order statistic properties in which the change unique to the group arises, to the modulated signal associated with the ID signal, on the basis of the ID signal stored in the ID signal storage module. In this case, the dimensions can increase by incorporating the concept of time differences in the frequency autocorrelation and IDs can be assigned to a larger number of groups to which the wireless signal belongs. Accordingly, individual IDs can be assigned even under the condition that a large number of groups coexist.

In addition, in the wireless transmitter, the ID signal storage module is desirably constituted to determine a frequency and delay time difference on the basis of an error correcting code by matching a sequence that is obtained using the error correcting code with a frequency and delay time difference by which the power peak for the second or higher-order statistic properties is obtained, and to store an ID signal so that the second or higher-order statistic properties determined by matching an emergence pattern of the power peak of the second or higher-order statistic properties with the error correcting code are made to appear in the signal to be transmitted; and the wireless signal ID assignment module is desirably constituted to generate the signal to be transmitted on the basis of an ID signal that is stored in the ID signal storage module. In this case, even when an error happens in the peak detection of the frequency autocorrelation value under the condition that the noise is large, the group to which the received signal belongs can be discriminated highly accurately by correcting the error.

In order to achieve the above object, a wireless receiver according to the present invention comprises a second or higher-order statistic properties database that stores, for each group, second or higher-order statistic properties unique to each of all groups to which a signal to be received possibly belongs; wireless signal reception module that wirelessly receives an incoming signal; and wireless signal group discrimination module that determines the second or higher-order statistic properties pertaining to the signal received by the wireless signal reception module and discriminates the group to which the received signal belongs, by comparing the second or higher-order statistic properties thus determined with second or higher-order statistic properties for each group stored in the second or higher-order statistic properties database. As a result of this constitution, the IDs can be discriminated simply by observing the second or higher-order statistic quantity added by the wireless transmitter without performing data demodulation. Further, by using the second or higher-order statistic properties, the group to which the received signal belongs can be determined highly accurately as a result of the suppression of the noise component.

In order to achieve the above object, a wireless communication system according to the present invention is a wireless communication system that is constituted comprising a wireless transmitter and a wireless receiver that exists in the vicinity of the wireless transmitter, wherein the wireless transmitter comprises ID signal storage module for storing an ID signal that identifies a group to which a data signal to be transmitted belongs and provides, for each group, second or higher-order statistic properties unique to each group; modulator for modulating the data signal; wireless signal ID assignment module for associating the modulated signal modulated by the modulator with the ID signal that is stored in the ID signal storage module, and for generating a signal to be transmitted, by assigning second or higher-order statistic properties that correspond with the ID signal to the modulated signal that is associated with the ID signal; and wireless signal transmission module for wirelessly transmitting the signal that is generated by the wireless signal ID assignment module, and wherein the wireless receiver comprises: a second or higher-order statistic properties database that stores, for each group, second or higher-order statistic properties unique to each of all groups to which a signal to be received possibly belongs; wireless signal reception module that wirelessly receives an incoming signal; and wireless signal group discrimination module that determines the second or higher-order statistic properties pertaining to the signal received by the wireless signal reception module and, discriminates the group to which the received signal belongs, by comparing the second or higher-order statistic properties thus determined with second or higher-order statistic properties for each group stored in the second or higher-order statistic properties database. As a result of this constitution, in the wireless transmitter, an ID can be assigned to a group to which the signal belongs by using only the second or higher-order statistic properties of the signal to be transmitted and the ID can be identified without performing data demodulation on the wireless receiver. In addition, by using the second or higher-order statistic properties, the group to which the received signal belongs can be accurately determined as a result of the suppression of the noise component.

Further, the present invention can be perceived as an invention according to a wireless signal control method that is executed by each of the wireless transmitter, wireless receiver, and wireless communication system, and can be described as follows. This affords the same action and effects as those of the invention according to the corresponding wireless transmitter, the invention according to the wireless receiver, and the invention according to the wireless communication system.

A wireless signal control method according to the present invention is a wireless signal control method, comprising an ID signal storage step in which, prior to communication, a wireless transmitter stores an ID signal that identifies a group to which a data signal to be transmitted belongs and provides, for each group, second or higher-order statistic properties unique to each group; a data modulation step in which the wireless transmitter modulates the data signal; a wireless signal ID assignment step in which the wireless transmitter associates the modulated signal modulated in the data modulation step with the ID signal stored in the ID signal storage step and, generates a signal to be transmitted, by assigning second or higher-order statistic properties corresponding with the ID signal to the modulated signal associated with the ID signal, and a wireless signal transmission step in which the wireless transmitter wirelessly transmits the signal generated in the wireless signal ID assignment step.

In addition, a wireless signal control method according to the present invention comprises a second or higher-order statistic properties storage step in which, prior to communication, a wireless receiver stores, for each group, second or higher-order statistic properties that are unique to each of all groups to which a signal to be received possibly belongs; a wireless signal reception step in which the wireless receiver wirelessly receives an incoming signal; and a wireless signal group discrimination step in which the wireless receiver determines the second or higher-order statistic properties pertaining to the signal received in the wireless signal reception step and, discriminates the group to which the received signal belongs, by comparing the second or higher-order statistic properties thus determined with second or higher-order statistic properties for each group stored in the second or higher-order statistic properties storage step.

In addition, a wireless signal control method according to the present invention is a wireless signal control method of a wireless communication system constituted comprising a wireless transmitter and a wireless receiver that exists in the vicinity of the wireless transmitter comprises: an ID signal storage step in which, prior to communication, a wireless transmitter stores an ID signal that identifies a group to which a data signal to be transmitted belongs and provides, for each group, second or higher-order statistic properties unique to each group; a data modulation step in which the wireless transmitter modulates the data signal; a wireless signal ID assignment step in which the wireless transmitter associates the modulated signal modulated in the data modulation step with the ID signal stored in the ID signal storage step and, generates a signal to be transmitted, by assigning second or higher-order statistic properties corresponding with the ID signal to the modulated signal associated with the ID signal, and a wireless signal transmission step in which the wireless transmitter wirelessly transmits the signal generated in the wireless signal ID assignment step; a second or higher-order statistic properties storage step in which, prior to communication, a wireless receiver stores, for each group, second or higher-order statistic properties that are unique to each of all groups to which a signal to be received possibly belongs; a wireless signal reception step in which the wireless receiver wirelessly receives an incoming signal; and a wireless signal group discrimination step in which the wireless receiver determines the second or higher-order statistic properties pertaining to the signal received in the wireless signal reception step and, discriminates the group to which the received signal belongs, by comparing the second or higher-order statistic properties thus determined with second or higher-order statistic properties for each group stored in the second or higher-order statistic properties storage step.

According to the present invention, in an environment where a plurality of groups coexist, the group to which the signal belongs can be discriminated without performing complex data demodulation processing on a received signal.

BRIEF DESCRIPTION OF THE DRAWINGS

FIG. 4 is a constitutional view of second or higher-order statistic properties database.

FIG. 14 shows an example of a transmission symbol that can be applied in a modified example that establishes a signal transmitted using a subcarrier that is used in ID signal transmission so that there is a concentration of energy of the signal in a predetermined frequency component.

DESCRIPTION OF THE PREFERRED EMBODIMENTS

Embodiments of the present invention will be described hereinbelow with respect to the drawings.

Constitution of the Wireless Transceiver Device

Figure 13:
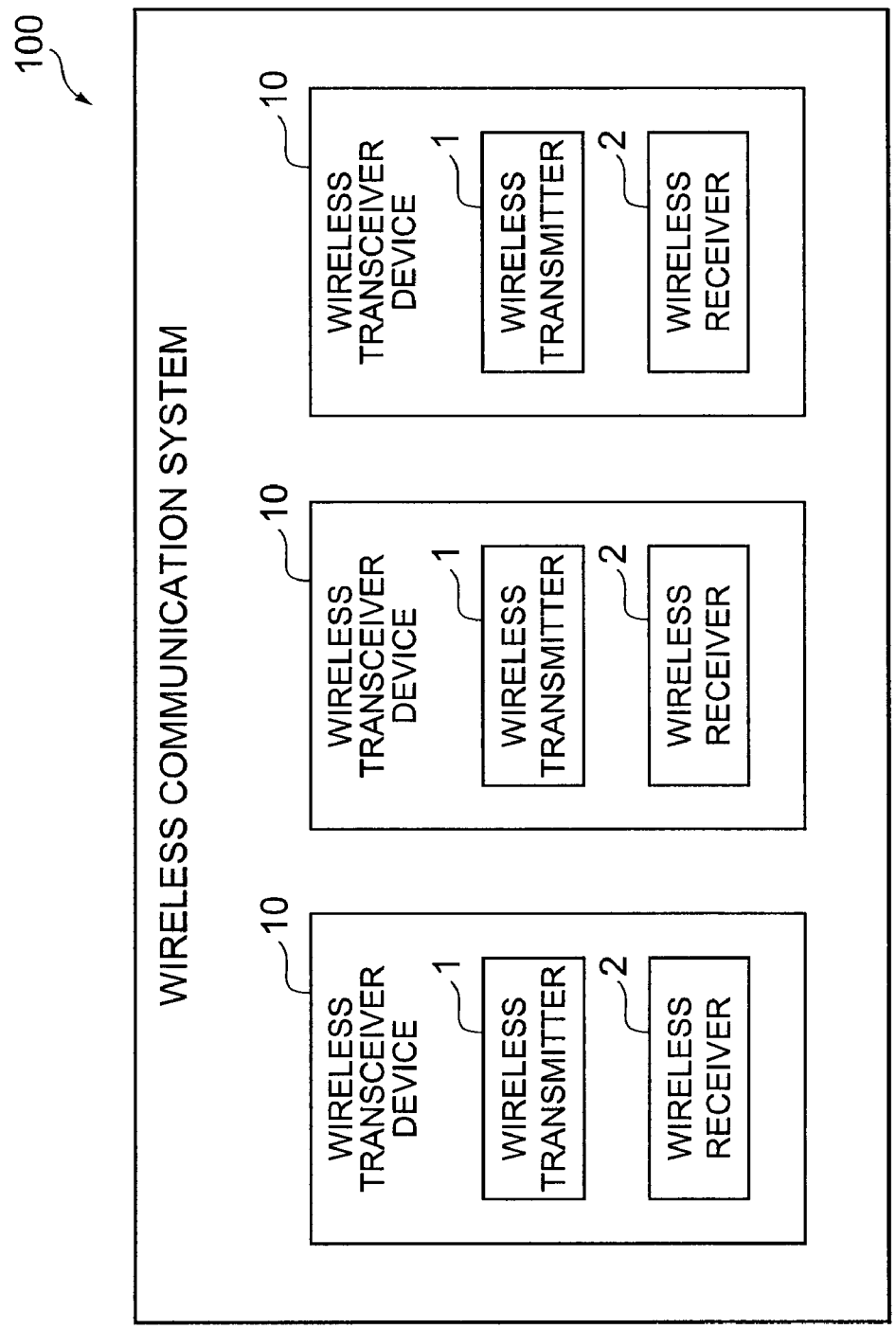
FIG. 13 is a block diagram showing the constitution of the wireless transceiver device.

First, the constitution of the wireless transceiver device according to this embodiment will be described. As shown in FIG. 13, the wireless transceiver device 10 according to this embodiment comprises both the constitution of the wireless transmitter 1 in FIG. 2 and the constitution of the wireless receiver 2 in FIG. 3 (these constitutions will be described subsequently) and a wireless communication system 100 is formed by a plurality of wireless transceivers 10. Further, although the wireless communication system of the present invention corresponds to the wireless communication system 100, there is no need for the wireless communication system according to the present invention to be constituted by a plurality of wireless transceivers 10 that comprise both the constitution of the wireless transmitter 1 and the constitution of the wireless receiver 2. In other words, the wireless communication system according to the present invention may have a constitution in which wireless transmitter 1 and wireless receiver 2 coexist and may, for example, have a constitution comprising, other than the wireless transceiver device 10, a device comprising only the constitution of the wireless transmitter 1 or a device that comprises only the constitution of the wireless receiver 2. In addition, according to the wireless communication system 100 of this embodiment, a plurality of groups performs simultaneous communications wirelessly by utilizing a common frequency band. That is, a plurality of wireless transceiver devices 10 send and receive wireless signals that belong to any group among a plurality of groups by utilizing a common frequency band. The groups, to which the wireless signals that are sent and received belong, vary depending on the individual wireless transceiver devices 10 and the same wireless transceiver device 10 is not limited to always sending and receiving wireless signals that belong to the same group (the groups can change).

The wireless transmitter 1 has a function for generating and transmitting a wireless signal so that the wireless signal that is transmitted has second or higher-order statistic properties that are unique to the group to which the wireless signal belongs. The wireless receiver 2 has a function for calculating second or higher-order statistic properties that the received wireless signal possesses and a function for discriminating the group to which the wireless signal belongs based on the second or higher-order statistic properties thereof and pre-stored second or higher-order statistic properties for each group.

Figure 1:
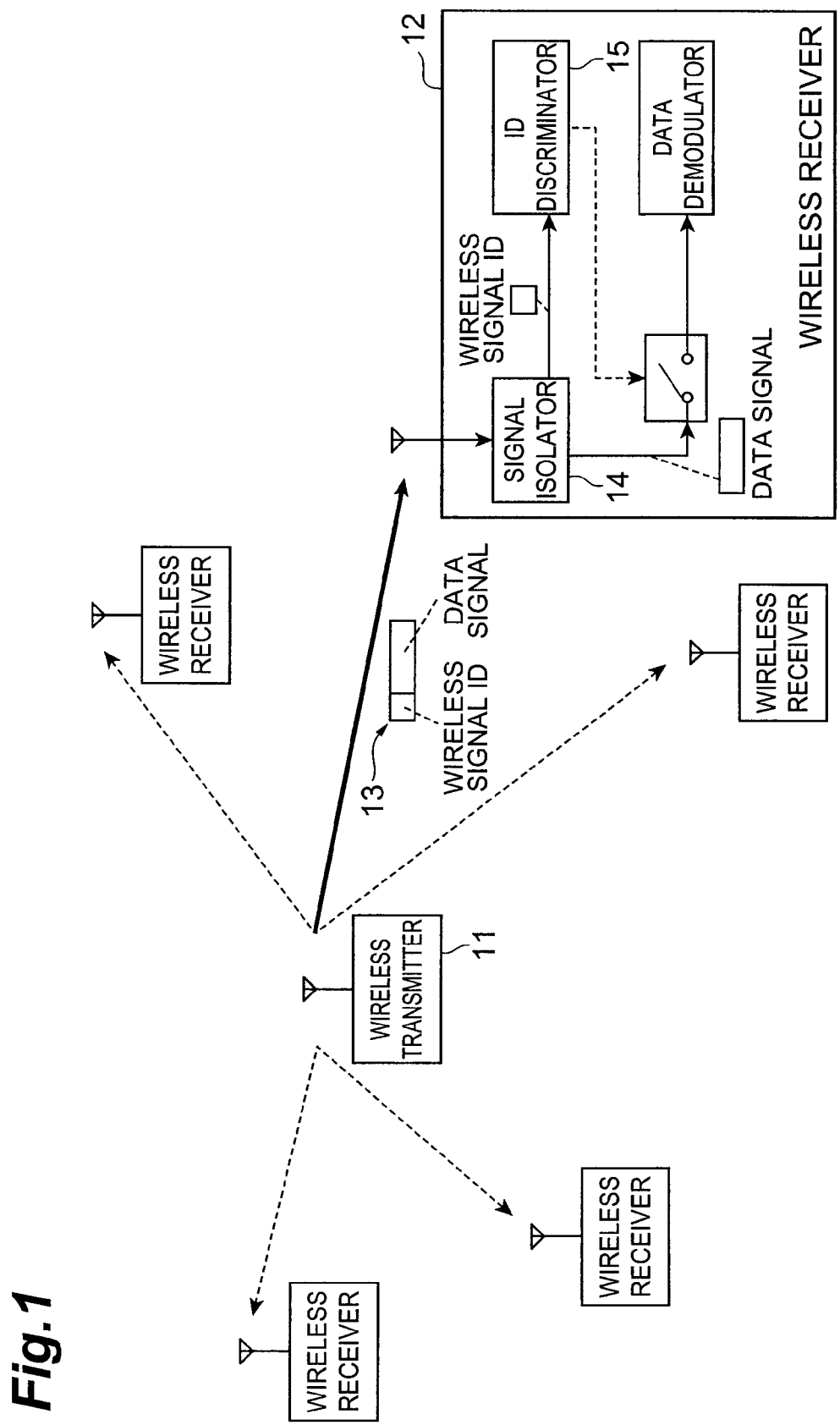
FIG. 1 shows prior art that is related to a wireless signal ID assignment method and ID discrimination method that perform demodulation.
Figure 2:
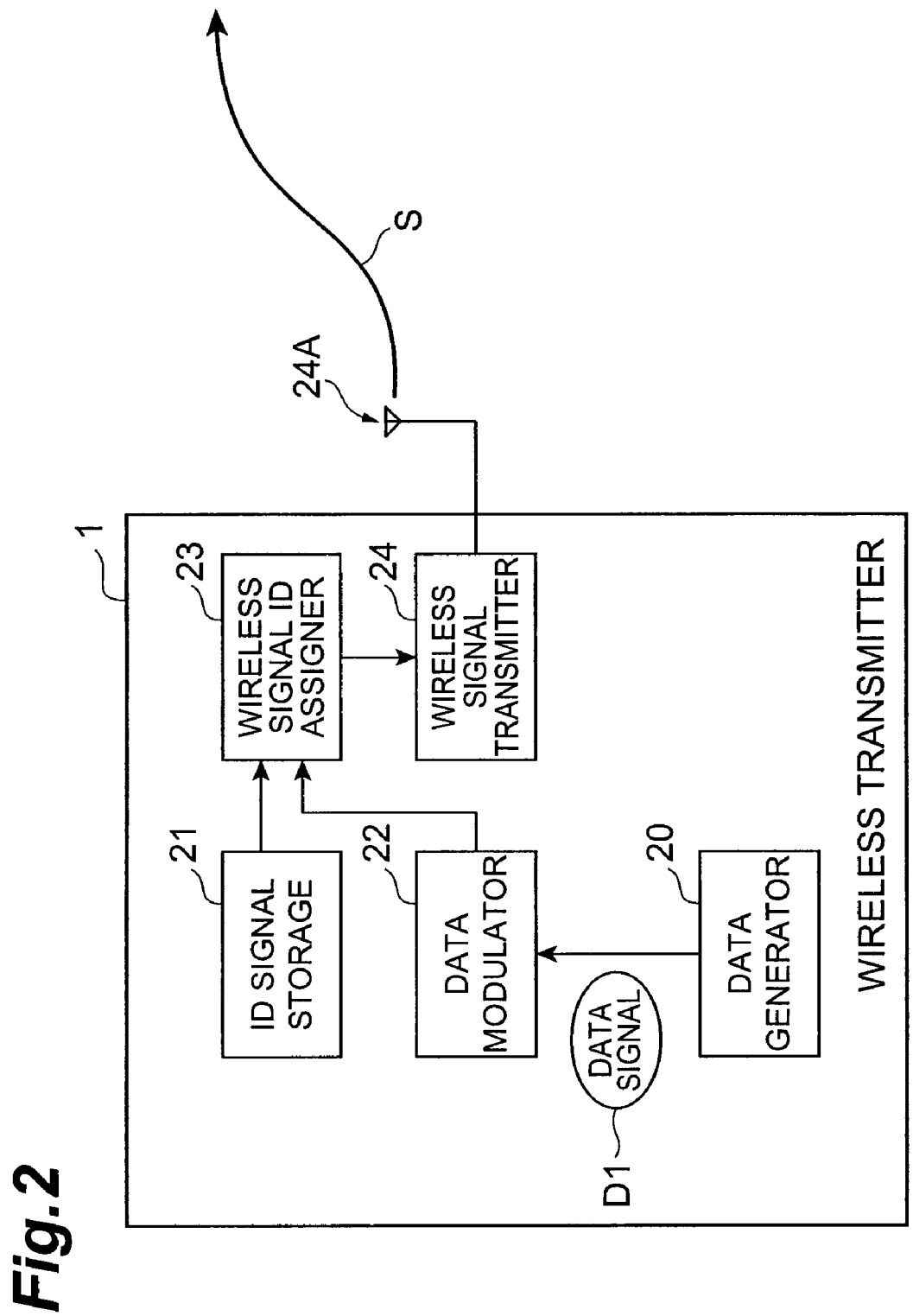
FIG. 2 is a block diagram representing the functional constitution of a wireless transmitter.
Figure 3:
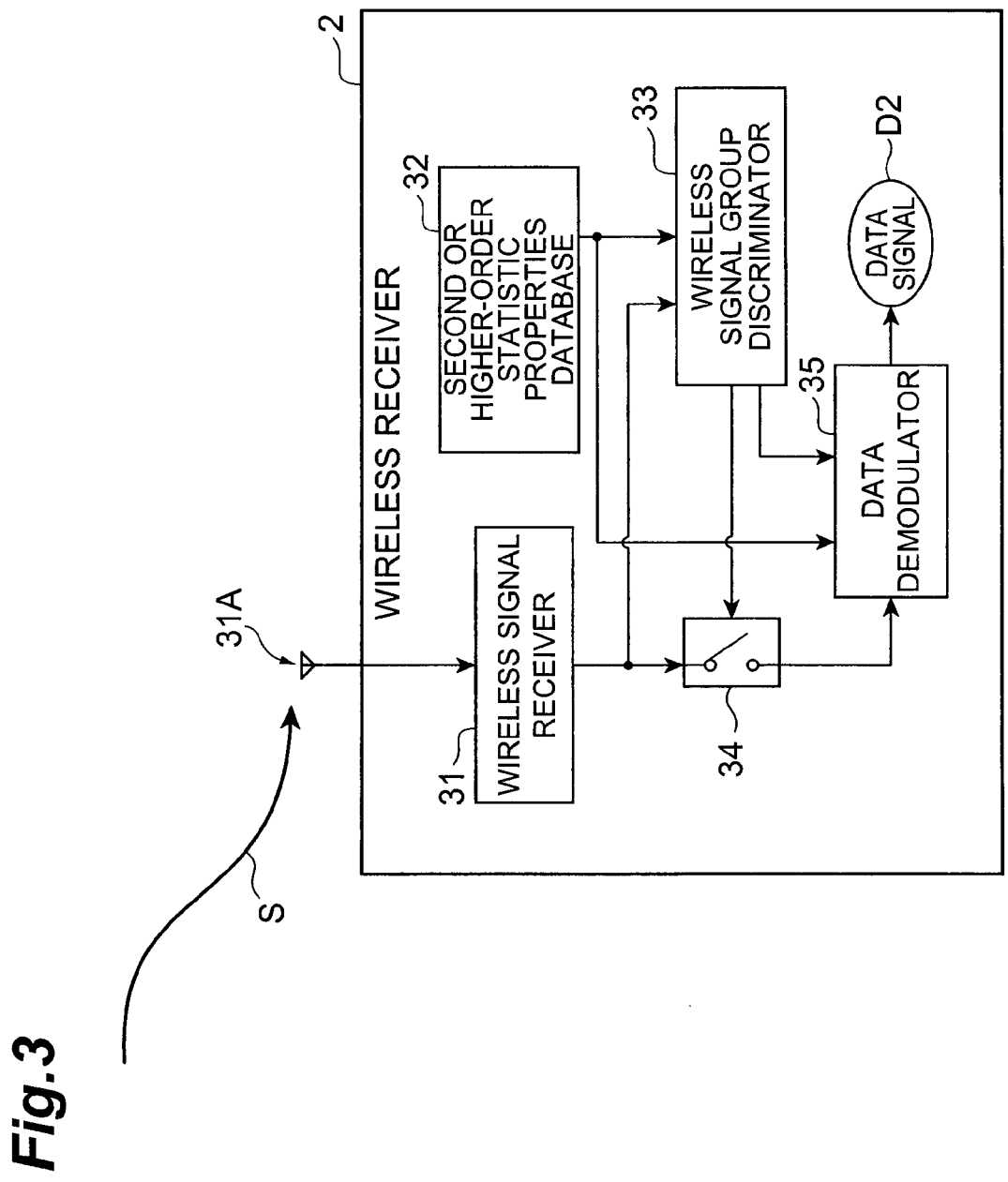
FIG. 3 is a block diagram representing the functional constitution of a wireless receiver.

FIG. 2 is a block diagram representing the functional constitution of wireless transmitter 1. As shown in FIG. 2, the wireless transmitter 1 is constituted functionally comprising data generator 20, ID signal storage 21, data modulator 22, wireless signal ID assigner 23, and wireless signal transmitter 24. In addition, FIG. 3 is a block diagram representing the functional constitution of the wireless receiver 2. As shown in FIG. 3, the wireless receiver 2 is constituted functionally comprising wireless signal receiver 31, a second or higher-order statistic property database 32, wireless signal group discriminator 33, a switch 34, and data demodulator 35.

The respective functional elements will be described in detail hereinbelow by using FIGS. 2 and 3.

The ID signal storage 21 of the wireless transmitter 1 stores ID signal data with second or higher-order statistic properties that are unique to the group to which the transmitted signal belongs. Second or higher-order statistic properties are properties that appear in statistic quantities such as a frequency correlation, time correlation, cyclic autocorrelation, cumulant, and moment, and second or higher-order statistic properties with two or more dimensions are relevant. Here, the ID signal storage 21 stores the sine wave with a specified frequency as the ID signal data so that the characteristic appears as the cyclic autocorrelation characteristic, for example. The cyclic autocorrelation characteristic for the time signal x(t) with respect to the delay time τ and the cycle frequency α is given by:

$$R_x(\alpha, \tau) = \int_{-\infty}^{\infty} x(t)x^*(t+\tau)e^{-j2\pi\alpha t}\,dt \quad (1)$$

and, when the delay time is 0, the cyclic autocorrelation characteristic for the sine wave is as follows:

$$\begin{aligned}R_{\sin(2\pi ft)}(\alpha, 0) &= \int_{-\infty}^{\infty} \sin(2\pi ft)\{\sin(2\pi ft)\}^* e^{-j2\pi\alpha t}\,dt \quad (2)\\ &= \int_{-\infty}^{\infty} \sin^2(2\pi ft) e^{-j2\pi\alpha t}\,dt \\ &= \int_{-\infty}^{\infty} \frac{1}{2}\{1-\cos(4\pi ft)\}e^{-j2\pi\alpha t}\,dt\end{aligned}$$

and the cyclic autocorrelation characteristic has a peak at the cycle frequency of two times the frequency of the sine wave, and becomes 0 for other cycle frequencies.

The data generator 20 generates the transmitted data signal D1 and outputs the generated data signal D1 to the data modulator 22.

The data modulator 22 modulates the transmitted data signal D1 in a format that is suited to wireless communications and outputs the signal that is modulated (called 'modulated signal' hereinbelow) to the wireless signal ID assigner 23. Further, although an example in which the wireless transmitter 1 comprises data generator 20 has been described in this embodiment, there is no requirement that the wireless transmitter 1 should comprise data generator 20. For example, an aspect in which the transmitted data signal D1 is input from the outside to the wireless transmitter 1 may also be adopted.

The wireless signal ID assigner 23 generates a signal for transmission by adding the sine wave which is held by the ID signal storage 21 to the input modulated signal and outputs the signal that has been generated for transmission to the wireless signal transmitter 24.

The wireless signal transmitter 24 transmits the wireless signal S that has undergone signal processing to wireless receiver 2 which is the communication partner via an antenna 24A after performing predetermined signal processing such as amplification, band-limiting, and frequency conversion on the transmission signal.

The wireless signal receiver 31 of the wireless receiver 2 shown in FIG. 3 receives wireless signal S via an antenna 31A and performs predetermined signal processing such as amplification, band-limiting, and frequency conversion on the received wireless signal S before outputting the processed signal to the wireless signal group discriminator 33 and switch 34.

Further, the wireless signal S is known as a 'transmission signal' when seen from the perspective of the wireless transmitter 1 and is called a 'received signal' when viewed from the perspective of the wireless receiver 2.

As shown in FIG. 4, the feature quantities of the second or higher-order statistic properties that are unique to each group and information on the time waveform of the ID signal that provides these feature quantities are associated and stored in the second or higher-order statistic properties database 32. Here, information on the cyclic autocorrelation characteristic, for example, is stored as the second or higher-order statistic properties.

The wireless signal group discriminator 33 calculates the cyclic autocorrelation characteristic for the received signal after the predetermined signal processing by the wireless signal receiver 31 and, by comparing the cyclic autocorrelation characteristic obtained using this calculation with the feature quantities of the second or higher-order statistic properties stored in the second or higher-order statistic properties database 32, discriminates the group to which the received wireless signal belongs.

Here, the feature quantity of the second or higher-order statistic properties is, for example, the frequency shift amount with which the power peak of frequency autocorrelation characteristic appears and, in cases where a sine wave is added as an ID signal, a frequency that is two times the frequency of the sine wave corresponds to the frequency shift amount. The second or higher-order statistic properties database 32 stores the frequency shift amount as the feature quantity for each group. Here, the power of the second or higher-order statistic properties of the received signal can be observed in the frequency shift amount constituting the feature quantity that is unique to each group to which the signal probably belongs and the group corresponding to the frequency shift amount at which the power peak appears can be discriminated as the group to which the received signal belongs, by comparing the magnitudes of the observed power.

Furthermore, in cases where the power peak of the second or higher-order statistic properties appears for a plurality of frequency shifts in one ID signal, the frequency shift amounts at which the power peak appears and the corresponding power values are stored in the second or higher-order statistic properties database 32. The wireless signal group discriminator 33 calculates the second or higher-order statistic properties for the received signal and performs detection of correlations between (1) the power values of the second or higher-order statistic properties of the calculation result and (2) the frequency shift amounts and corresponding to the power values stored in the second or higher-order statistic properties database 32, and discriminates the group corresponding to the feature quantity with the highest correlation among the feature quantities stored in the second or higher-order statistic properties database 32 as the group to which the received signal belongs.

The wireless signal group discriminator 33 outputs a control signal corresponding with the discrimination result to the switch 34. More specifically, in cases where, as a result of the discrimination of the group to which the received signal belongs, the received signal is a signal for the wireless receiver 2, the wireless signal group discriminator 33 outputs a control signal that turns the switch 34 ON. However, in cases where the received signal is not a signal for the wireless receiver 2, the wireless signal group discriminator 33 outputs a control signal that turns the switch 34 OFF. In addition, the wireless signal group discriminator 33 outputs the result of discriminating the group to which the received signal belongs to the data demodulator 35 in cases where the received signal is a signal for the wireless receiver 2.

The switch 34 is turned ON and OFF in accordance with the control signal that is input via the wireless signal group discriminator 33. As a result, in cases where the received signal is a signal for the wireless receiver 2, the received signal input via the wireless signal receiver 31 is output to the data demodulator 35 and, in cases where the received signal is transmitted for other receivers, the received signal is not output to the data demodulator 35 and the processing is terminated.

When the result of discriminating the group to which the received signal belongs is input from the wireless signal group discriminator 33, the data demodulator 35 extracts the waveform of the ID signal corresponding to the group from the second or higher-order statistic properties database 32 and subtracts the waveform of the extracted ID signal from the received signal and obtains the data signal D2 by demodulating the signal of the subtraction result.

Operation Relating to the Wireless Transmission/Reception

Figure 5:
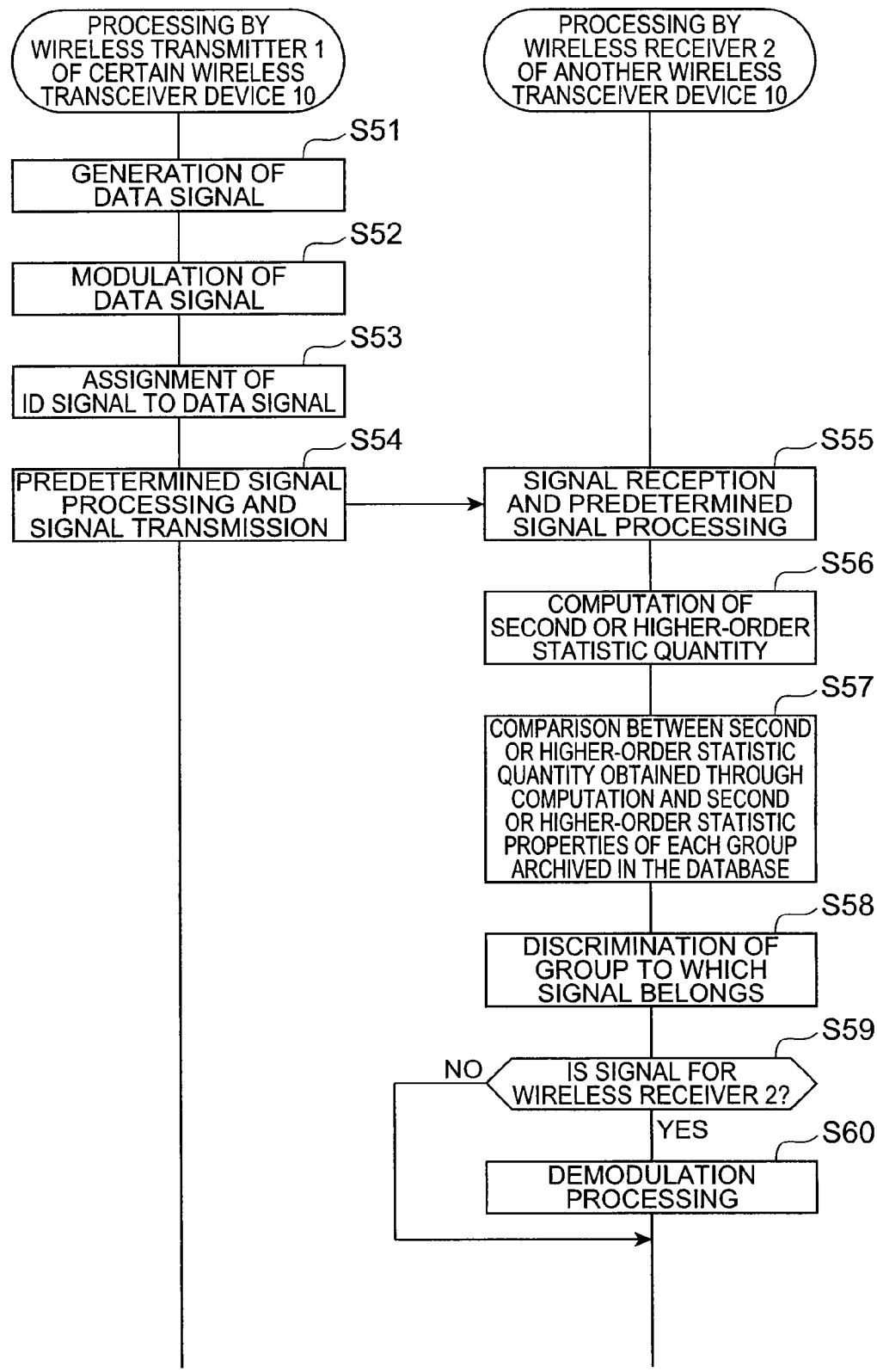
FIG. 5 is a flowchart of the procedure for a wireless transceiver operation.

Thereafter, the operation relating to the wireless transmission/reception method that is executed between a plurality of wireless transceiver devices 10 (called the 'wireless transmission/reception operation' hereinbelow) will be described. FIG. 5 shows the procedure relating to a wireless transmission/reception operation (mainly the assignment of an ID to a transmission signal and the discrimination of the ID of the received signal) that is executed between the wireless transmitter 1 of a certain wireless transceiver device 10 (called simply 'wireless transmitter 1' hereinbelow) and a wireless receiver 2 of another wireless transceiver 10 (called simply 'wireless receiver 2' hereinbelow).

In the wireless transmission/reception operation according to this embodiment, when an ID is assigned to a wireless signal (that is, a signal for transmission is generated by assigning second or higher-order statistic properties corresponding to the ID signal to the modulated signal that is associated with the ID signal), first, in the wireless transceiver 1, the data generator 20 generates a data signal D1 (S51), the data modulator 22 modulates the data signal D1 to the format suited to wireless communications, and outputs the modulated data signal D1 to the wireless signal ID assigner 23 (S52).

The wireless signal ID assigner 23 extracts a sine wave with a specified frequency as an ID signal with second or higher-order statistic properties unique to the group to which the signal for transmission belongs that is stored in the ID signal storage 21 and adds the extracted sine wave to the modulated data signal (that is, assigns an ID signal to the data signal), whereby a signal for transmission is generated (S53). The signal for transmission is output to the wireless signal transmitter 24.

The wireless signal transmitter 24 performs predetermined signal processing such as amplification, band limiting and frequency conversion and so forth with respect to the signal for transmission and transmits the wireless signal S that has undergone signal processing to the wireless receiver 2 constituting the communication partner via the antenna 24A (S54).

The wireless signal S is received by the wireless receiver 2 that exists at the periphery of the wireless transmitter 1 (in reality, the wireless transceiver device 10 in FIG. 13 that comprises the function of the wireless receiver 2).

Figure 6:
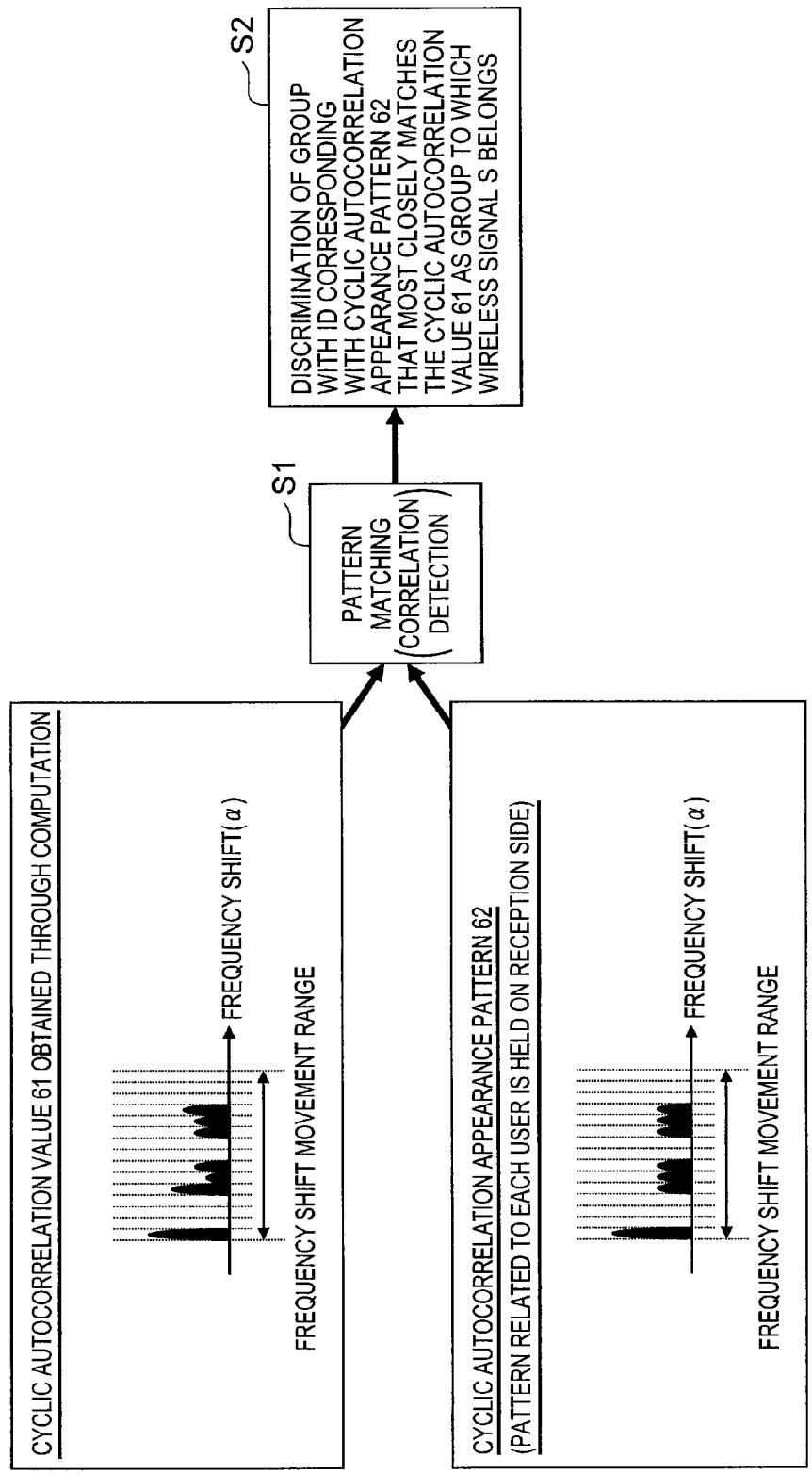
FIG. 6 shows the ID detection method of pattern matching with respect to cyclic autocorrelation.

In the wireless receiver 2, the wireless signal receiver 31 performs predetermined signal processing such as amplification, band limiting, and frequency conversion on the wireless signal S after receiving the wireless signal S (S55). Further, the wireless signal group discriminator 33 calculates the second or higher-order statistic properties (here, the cyclic autocorrelation characteristic) pertaining to the received wireless signal S (S56). Thereafter, the wireless signal group discriminator 33 compares the feature quantities of the second or higher-order statistic properties (here, the cyclic autocorrelation characteristic) unique to the group to which the received signal probably belongs that is stored in the second or higher-order statistic properties database 32 with the second or higher-order statistic properties obtained from the calculation of step S56 (S57) and discriminates the group to which the received wireless signal S belongs on the basis of the comparison result (S58). In the comparison processing and discrimination processing at this time, the wireless signal group discriminator 33 performs pattern matching by means of correlation detection and so forth between the feature quantity of the second or higher-order statistic properties stored in the second or higher-order statistic properties database 32 (here, a cyclic autocorrelation appearance pattern 62) and the cyclic autocorrelation value 61 that is obtained by means of a calculation, as per FIG. 6, for example (S1) and discriminates that the group with an ID that corresponds to the cyclic autocorrelation appearance pattern 62 with the greatest match to the cyclic autocorrelation value 61 that actually emerges is the group to which the received wireless signal S belongs (S2).

Thereafter, the wireless signal group discriminator 33 determines whether the received wireless signal S is a signal for the wireless receiver 2 on the basis of the discrimination result in step S58 (S59). Here, in cases where the wireless signal S is a signal for the wireless receiver 2, the switch 34 is turned ON so that wireless signal S is input to the data demodulator 35 and data demodulator 35 performs data demodulation processing with respect to the wireless signal S as described hereinbelow (S60) and the processing is terminated. Thereupon, the wireless signal group discriminator 33 outputs the result of discriminating the group to which the wireless signal S belongs to the data demodulator 35 and the data demodulator 35 performs demodulation processing by extracting an ID signal waveform that is stored in the second or higher-order statistic properties database 32 on the basis of the group discrimination result and subtracting the extracted ID signal waveform from the wireless signal S. Further, in the step S59, in cases where the received wireless signal S is not a signal for the wireless receiver 2, the processing is terminated without performing demodulation processing.

Effects of this Embodiment

Figure 7:
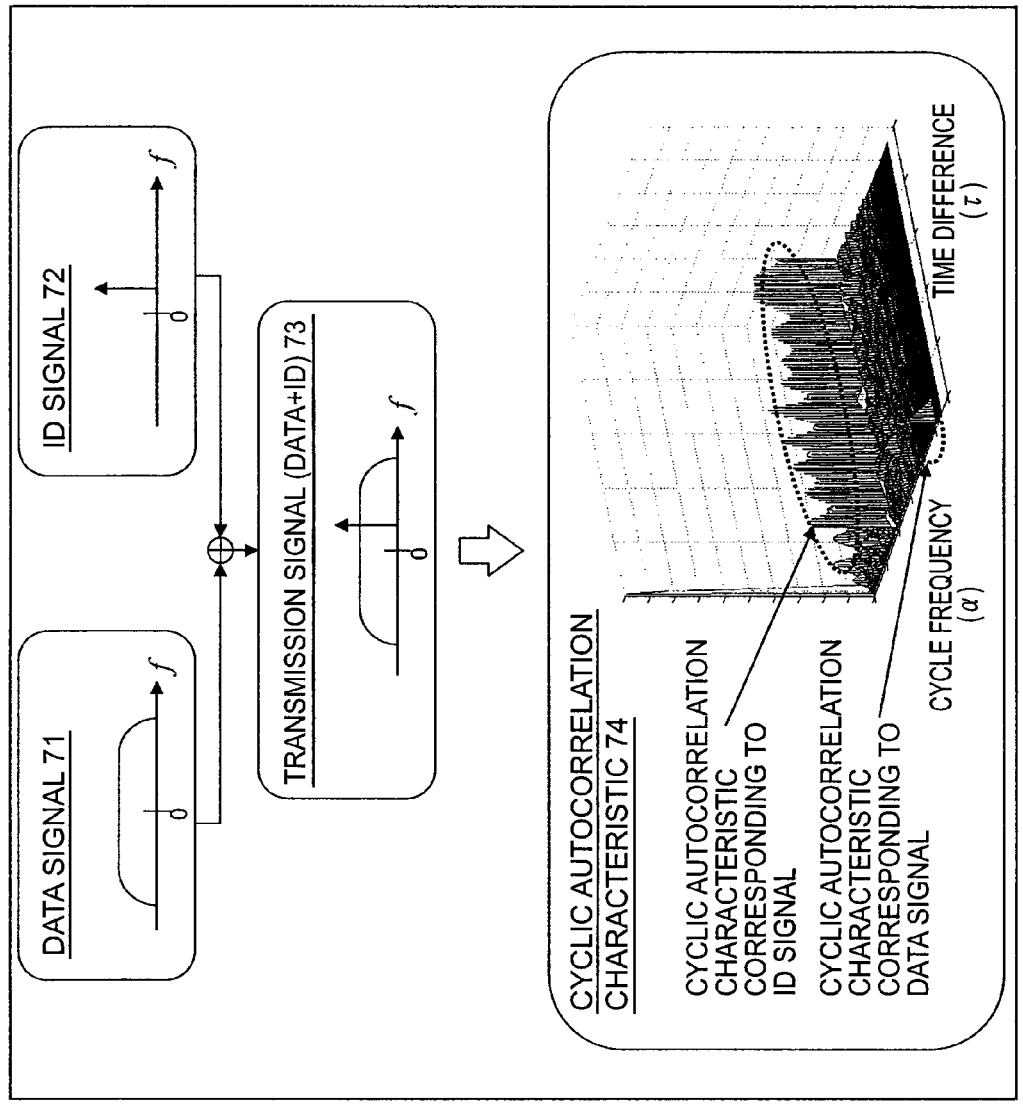
FIG. 7 shows the relationship between a transmission signal that assigns an ID by means of an ID signal addition and a cyclic autocorrelation characteristic.

The effects of this embodiment will be described next. In the wireless transmission/reception processing, the wireless signal ID assigner 23 of the wireless transmitter 1 adds a sine wave as an ID signal to the data signal that is to be transmitted and the wireless signal group discriminator 33 of the wireless receiver 2 computes the cyclic autocorrelation characteristic as the second or higher-order statistic properties of the received wireless signal and discriminates the group to which the received wireless signal belongs on the basis of the cyclic autocorrelation characteristic. FIG. 7 shows the relationship between the transmitted signal 73 (in other words, the sum of the data signal 71 and ID signal 72) and the cyclic autocorrelation characteristic 74 of the received signal. In the case of the cyclic autocorrelation characteristic 74 related to the transmission signal 73 obtained by adding a sine wave of a predetermined frequency (ID signal 72) that is unique to the group to which the signal belongs to the data signal 71, a correlation value peak (cyclic autocorrelation characteristic corresponding with the data signal) appears at the cycle frequency corresponding with the data signal 71 (the cyclic autocorrelation characteristic corresponding to the data signal) as per FIG. 7 and a correlation value peak appears at a cycle frequency that is two times that of the predetermined frequency (the cyclic autocorrelation characteristic corresponding to the ID signal) appears. Hence, among the above, the peak of the received wireless signal can be discriminated by the cyclic autocorrelation characteristic corresponding with the ID signal (more specifically, the point of emergence of the correlation value peak). As a result, the wireless receiver 2 is able to discriminate the group to which the wireless signal belongs without performing the data demodulation processing of the received wireless signal. Further, the cyclic autocorrelation characteristic is determined by the relative frequency difference (the cycle frequency for the cyclic autocorrelation) and is not decided by the absolute value of the frequency component that is contained in the received wireless signal and is not subjected to the effect of the carrier frequency offset or symbol timing offset. Hence, the detection of the ID can be performed by calculating the characteristic without establishing strict synchronization for the symbol timing or highly accurate frequency control using Automatic Frequency Control (AFC) with respect to the received wireless signal. Hence, the ID detection can be performed more accurately than in a case where data demodulation is performed.

Modified Example of Wireless Transceiver Device

A variety of modified examples of the wireless transceiver device according to this embodiment will be described next.

A first modified example uses a plurality of sine waves as ID signals in the wireless transceiver device 10. In other words, the ID signal storage 21 stores, as an ID signal, a multiplexed wave that is obtained by adding a plurality of sine waves and the wireless signal ID assigner 23 generates a transmission signal by adding the ID signal stored in the ID signal storage 21 (a multiplexed wave to which a plurality of sine waves have been added) to a modulated signal that is obtained by modulating the data signal, and outputs the transmission signal thus generated. As a result, the cyclic autocorrelation characteristic is such that a correlation value peak appears at a cycle frequency that corresponds to the difference in frequency of a plurality of sine waves and, even when the number of target groups (the number of groups to which the data signal can belong) increases, a unique ID signal that is allocated to each group can be secured.

A second modified example uses a modulated signal with a predetermined signal bandwidth as an ID signal in the wireless transceiver device 10. In other words, the ID signal storage 21 stores a modulated signal with a predetermined bandwidth as an ID signal and the wireless signal ID assigner 23 generates a transmission signal by adding the ID signal stored in the ID signal storage 21 (modulated signal with a predetermined bandwidth) to the modulated signal obtained by modulating the data signal, and outputs the transmission signal thus generated. As a result, whereas, for the cyclic autocorrelation characteristic, a correlation value power peak appears close to delay time 0 (zero) at a cycle frequency that corresponds with the signal bandwidth of the ID signal, there is no correlation when the delay time is large. Accordingly, because a correlation value characteristic that differs from that with a sine wave appears, even when the number of target groups (the number of groups to which the data signal belongs) increases, a unique ID signal that is allocated to each group can be secured.

Figure 8:
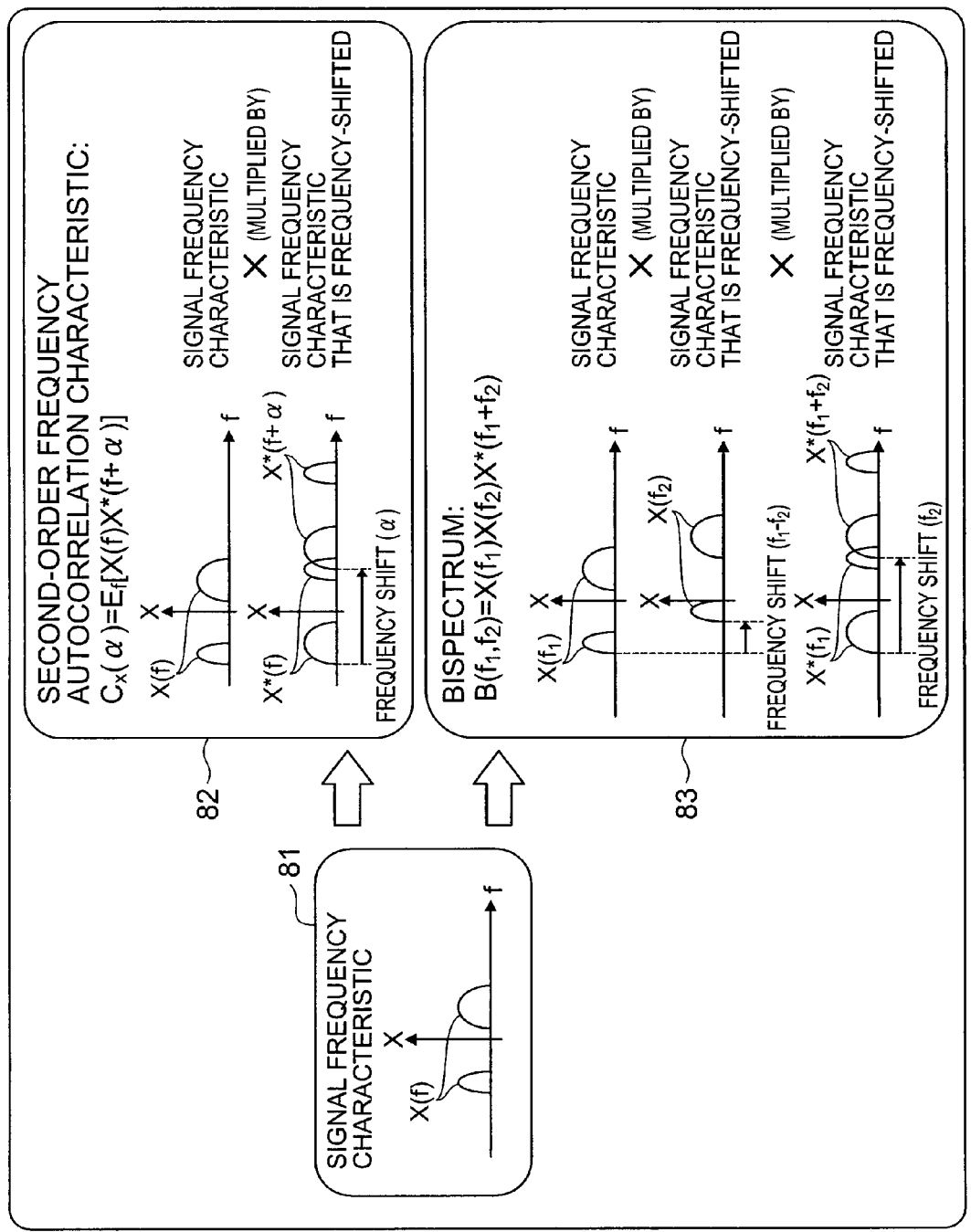
FIG. 8 is a conceptual view of a high-order cyclic autocorrelation.

A third modified example is an example that uses a frequency autocorrelation characteristic instead of a cyclic autocorrelation characteristic as second or higher-order statistic properties in the wireless transceiver device 10. Thereupon, the ID signal storage 21 of the wireless transmitter 1 stores an ID signal with a frequency autocorrelation characteristic that is unique to the group to which the data signal belongs and the wireless signal ID assigner 23 generates a transmission signal by modulating the data signal and adding the ID signal stored in the ID signal storage 21 to the modulated signal thus obtained. In addition, the second or higher-order statistic properties database 32 of the wireless receiver 2 stores the feature quantity of the frequency autocorrelation characteristic that is unique to groups to which the received signal possibly belongs and the wireless signal group discriminator 33 computes the frequency autocorrelation characteristic for the received signal received by the wireless signal receiver 31 and compares the frequency autocorrelation characteristic obtained in the calculation and the feature quantity of the frequency autocorrelation characteristic for each group stored in the second or higher-order statistic properties database 32, before discriminating the group to which the received signal belongs. FIG. 8 shows a second-order frequency autocorrelation characteristic 82 and a bi-spectrum 83 which is a special example of a third-order frequency autocorrelation, as an example of a second or higher-order frequency autocorrelation characteristic. The second-order frequency autocorrelation characteristic 82 is obtained by calculating a correlation value by taking the average in the frequency direction by multiplying the frequency characteristic for the signal by the frequency characteristic for a signal that has undergone a frequency shift of a predetermined amount. The numerical definition of the second-order frequency autocorrelation characteristic 82 is given by:

$$C_x(\alpha) = E_f[X(f)X^*(f+\alpha)] \quad (3)$$

when the frequency characteristic 81 of the received signal is $X(f)$. Here, $E_f$ represents the expected value for the frequency $f$ and $\alpha$ represents the frequency shift. Further, the bispectrum 83, which is a special example of a third-order frequency autocorrelation, is obtained by multiplying the frequency characteristic for the signal, the frequency characteristic for a signal that has undergone a frequency shift of a first predetermined amount, and a frequency characteristic for a signal that has undergone a frequency shift of a second predetermined amount. The numerical definition of the bispectrum 83 is given by:

$$B(f_1, f_2) = X(f_1)X(f_2)X^*(f_1+f_2) \quad (4)$$

when the frequency characteristic 81 of the received signal is $X(f)$. By using the frequency autocorrelation characteristic in this manner, in cases where a plurality of sine waves are used as the ID signal in particular, a frequency autocorrelation peak appears at a frequency that corresponds with the frequency difference in a plurality of sine waves and, therefore, although the generation of a sine wave of a correct frequency, such as the generation of a sine wave by means of a local oscillator, is difficult, in a situation where the relative frequency difference can be accurately determined, the frequency at which the frequency autocorrelation peak appears can be accurately determined.

A fourth modified example is an example in which both a frequency autocorrelation characteristic and a cyclic autocorrelation characteristic are used as the second or higher-order statistic properties in the wireless transceiver 10. In this case, the ID signal storage 21 of the wireless transmitter 1 stores an ID signal having both a frequency autocorrelation characteristic and a cyclic autocorrelation characteristic that are unique to the group to which the data signal belongs and the wireless signal ID assigner 23 generates a transmission signal by adding the ID signal that is stored in the ID signal storage 21 to the modulated signal obtained by modulating the data signal. The second or higher-order statistic properties database 32 of the wireless receiver 2 stores both the feature quantities of the frequency autocorrelation characteristic and the cyclic autocorrelation characteristic that are unique to the groups that the received signal possibly belongs to and the wireless signal group discriminator 33 computes both the frequency autocorrelation characteristic and cyclic autocorrelation characteristic for the received signal received by the wireless signal receiver 31 and performs a comparison of both the frequency autocorrelation characteristic and cyclic autocorrelation characteristic obtained in this calculation and both the feature quantities of the frequency autocorrelation characteristic and the cyclic autocorrelation characteristic stored in the second or higher-order statistic properties database 32, and discriminates the group to which the received signal belongs. As a result, even for a plurality of received signals that possess different cyclic autocorrelation characteristics while holding the same frequency autocorrelation characteristic, discrimination of the IDs of these received signals is possible and, even when the number of target groups (the number of groups to which the data signal can belong) increases, a unique ID signal that is allocated to each group can be secured.

A fifth modified example is such that the wireless signal ID assigner 23 of the wireless transmitter 1 performs ID assignment by modulating the data signal and multiplying the modulated signal thus obtained by the ID signal. 'Multiply' as it used here means multiplying the modulated signal s(t) obtained by modulating the data signal by the ID signal $g_{id}(t)$ for each period, where the transmission signal x(t) may be $$x(t)=g_{id}(t)s(t) \tag{5}$$

or, multiplied on the frequency axis (equivalent to a convolution operation on the time axis), may be as follows.

$$x(t)=\int g_{id}(\tau)s(t-\tau)d\tau \tag{6}$$

In this modified example, multiplication is carried out at each time.

Here, the ID signal storage 21 stores, as an ID signal, the ID signal so that predetermined second or higher-order statistic properties appear by modulating the data signal and multiplying the modulated signal by the ID signal. The wireless signal ID assigner 23 generates a transmission signal by modulating the data signal and multiplying the modulated signal by the ID signal stored in the ID signal storage 21. Furthermore, the second or higher-order statistic properties database 32 of the wireless receiver 2 stores feature quantities of the cyclic autocorrelation characteristic for a group to which the received signal possibly belongs and the signal waveform pattern of the ID signal. The data demodulator 35 is able to demodulate the data signal component without being affected by the ID signal component by dividing the received signal by the waveform pattern of the ID signal of the group to which the received signal belongs that is stored in the second or higher-order statistic properties database 32.

Figure 9:
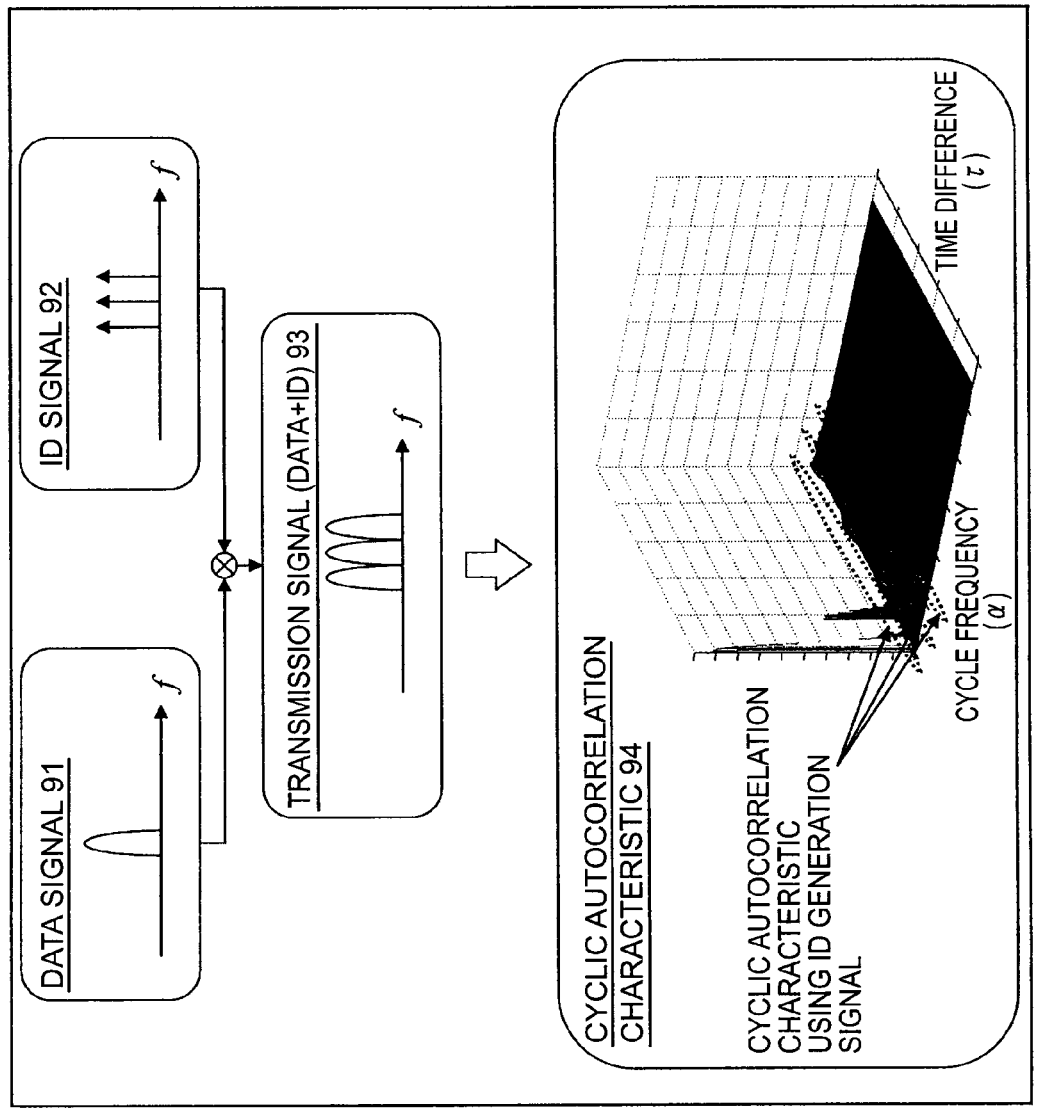
FIG. 9 is a constitutional example of the ID assignment method using multiplication of the ID signal.

FIG. 9 shows an example of an ID assignment method using multiplication of the ID signal. The wireless transmitter 1 generates the transmission signal 93 by multiplying a data signal 91 by an ID signal 92. The wireless receiver 2 computes the second or higher-order statistic properties of the received transmission signal 93 and performs ID detection. In the example of FIG. 9, a case where the cyclic autocorrelation characteristic 94 is used as the second or higher-order statistic properties is shown. In FIG. 9, by multiplying the data signal 91 by the ID signal 92, the transmission signal 93 is generated so that the same waveform appears repeatedly on the frequency axis (three times). For example, if we assume that the ID signal 92 is added to the source signal of the data signal by frequency-shifting the data signal 91 (s(t)) by fc and the transmission signal x(t) that is obtained after multiplying the ID signal 92 by the data signal 91 is expressed by:

$$x(t)=s(t)+s(t)e^{j2\pi fct}+s(t)e^{j2\pi(2fc)t} \tag{7}$$

then the cyclic autocorrelation characteristic 94 when the time difference is zero is expressed by:

$$Rx(\alpha, 0) = \int_{-\infty}^{\infty} \{s(t) + s(t)e^{j2\pi fct} + s(t)e^{j4\pi fct}\} \tag{8}$$

$$\{s^*(t) + s(t)^*e^{-j2\pi fct} + s(t)^*e^{-j4\pi fct}\}e^{-j2\pi\alpha t}dt$$

$$= \int_{-\infty}^{\infty} |s(t)|^2 \{3 + (2e^{j2\pi fct} + 2e^{-j2\pi fct}) +$$

$$(e^{j4\pi fct} + e^{-j4\pi fct})\}e^{-j2\pi\alpha t}dt.$$

For this reason, when the cycle frequency α matches the frequency shift amount fc of the ID signal 92 or two times the frequency shift amount (that is, 2 fc), the correlation peak appears. Thus, by multiplying the ID signal by the data signal, the second or higher-order statistic properties can be allocated characteristically to each group to which the data signal belongs and ID allocation and discrimination can be carried out.

A sixth modified example uses a frequency autocorrelation characteristic as the second or higher-order statistic properties in place of the cyclic autocorrelation characteristic of the fifth modified example. Here, the ID signal storage 21 of the wireless transmitter 1 stores, as an ID signal, the ID signal such that a frequency autocorrelation characteristic that is unique to the group to which the data signal belongs is added by multiplying the transmission signal by the ID signal. The wireless signal ID assigner 23 generates a transmission signal by modulating the data signal and multiplying the ID signal that is stored in the ID signal storage 21 by the modulated signal thus obtained. In addition, the second or higher-order statistic properties database 32 of the wireless receiver 2 stores an ID signal waveform and the feature quantity of the frequency autocorrelation characteristic that is unique to the groups to which the received signal possibly belongs. The wireless signal group discriminator 33 computes a frequency autocorrelation characteristic for the received signal that is received by the wireless signal receiver 31 and performs a comparison between the feature quantities of the frequency autocorrelation characteristic obtained through computation and the frequency autocorrelation characteristic stored in the second or higher-order statistic properties database 32, thereby discriminating the group to which the received signal belongs. By using the frequency autocorrelation characteristic in this manner, in cases where a plurality of sine waves are used as the ID signal in particular, because the frequency autocorrelation peak appears at a frequency that corresponds to the frequency difference of the plurality of sine waves, although the generation of a sine wave of the correct frequency, such as the generation of a sine wave by means of a local oscillator, is difficult, in a situation where the relative frequency difference can be accurately determined, the frequency at which the frequency autocorrelation peak appears can be accurately determined.

A seventh modified example is an example in which both a frequency autocorrelation characteristic and a cyclic autocorrelation characteristic are used as the second or higher-order statistic properties of the fifth modified example. In this case, the ID signal storage 21 of the wireless transmitter 1 stores, as the ID signal, an ID signal such that both a frequency autocorrelation characteristic and a cyclic autocorrelation characteristic that are unique to the group to which the data signal belongs are added by multiplying the transmission signal by the ID signal. The wireless signal ID assigner 23 generates a transmission signal by modulating the data signal and multiplying the ID signal that is stored in the ID signal storage 21 by the modulated signal thus obtained. The second or higher-order statistic properties database 32 of the wireless receiver 2 stores the feature quantities of both a frequency autocorrelation characteristic and a cyclic autocorrelation characteristic that are unique to the groups to which the received signal possibly belongs. The wireless signal group discriminator 33 computes both a frequency autocorrelation characteristic and also a cyclic autocorrelation characteristic for the received signal that is received by the wireless signal receiver 31 and performs a comparison between the feature quantities of both the frequency autocorrelation characteristic and also the cyclic autocorrelation characteristic obtained through computation and the both the frequency autocorrelation characteristic and also the cyclic autocorrelation characteristic stored in the second or higher-order statistic properties database 32, thereby discriminating the group to which the received signal belongs. As a result, even for a plurality of received signals that possess different cyclic autocorrelation characteristics while holding the same frequency autocorrelation characteristic, discrimination of the IDs of these received signals is possible and, even when the number of target groups (the number of groups to which the data signal can belong) increases, a unique ID signal that is allocated to each group can be secured.

An eighth modified example is such that, when the wireless transmitter 1 transmits a wireless signal by means of multi-carrier transmission, the transmission content of each subcarrier is established on the basis of the assigned ID signal (in other words, the assignment of an ID is carried out according to the transmission content of the subcarriers for multicarrier transmission). As the relationship between ID assignment at the time of multicarrier transmission and second or higher-order statistic properties according to this modified example, the relationship between ID assignment and a second-order frequency autocorrelation characteristic will be described hereinbelow. Further, ID assignment can also be carried out using the same procedure in cases where second or higher-order statistic properties other than the second-order frequency autocorrelation characteristic are used.

In multicarrier transmission, a plurality of subcarriers are transmitted in parallel with frequency spacing of $\Delta f$. Here, the transmission signal that is transmitted in the multicarrier transmission is expressed by:

$$x(i) = \sum_{k=0}^{K-1} s_k(iT_s) \cdot e^{j2\pi k \Delta f i T_s} \quad (9)$$

Here, $s_k(t)$ represents a transmission signal waveform for the subcarrier k; $T_s$ represents the sampling rate, and K represents the number of subcarriers. The frequency characteristic of the transmission signal is then:

$$X(f) = \sum_{i=-\infty}^{\infty} \left\{ \sum_{k=0}^{K-1} s_k(iT_s) \cdot e^{j2\pi k \Delta f i T_s} \right\} e^{-j2\pi f i T_s} \quad (10)$$

$$= \sum_{i=-\infty}^{\infty} \left\{ \sum_{k=0}^{K-1} s_k(iT_s) \cdot e^{-j2\pi (f-k\Delta f) i T_s} \right\}$$

$$= \sum_{k=0}^{K-1} S_k(f - k\Delta f)$$

However, $S_k(f)$ is a frequency expression of the signal $s_k(t)$ that is transmitted via the subcarrier and $$S_k(f)=0, f \geq \Delta f \text{ or } f<0, \text{ for } \forall k \quad (11)$$

Here, the second-order frequency autocorrelation characteristic is:

$$C_X(\alpha) = E_f\left[\left\{\sum_{k=0}^{K-1} S_k(f-k\Delta f)\right\}\left\{\sum_{k=0}^{K-1} S_k^*(f-k\Delta f+\alpha)\right\}\right] \quad (12)$$

and, if we assume that $\alpha=\beta\Delta f$ ($\beta\epsilon Z$), $$C_X(\beta\Delta f) = \left\{\sum_{k=0}^{K-1} S_k(f-k\Delta f)\right\}\left\{\sum_{k=0}^{K-1} S_k^*(f-k\Delta f+\beta\Delta f)\right\} \quad (13)$$

$$= \sum_{k=0}^{K-1} S_k(f-k\Delta f) S_{k+\beta}^*(f-k\Delta f)$$

$$= \sum_{k=0}^{K-1} S_k S_{k+\beta}^*$$

In other words, the result of multiplying each of the source signal and $\beta$ adjacent subcarrier signals and then taking the sum thereof is the second-order frequency autocorrelation characteristic. However, under the condition that the sampling time interval cannot be made sufficiently small, the high frequency component that is removed from the observed frequency band determined by the sampling rate appears within a low frequency range. Here, if we assume that the observed frequency band is $0 \leq f \leq K\Delta f$, Equation (13) is as follows.

$$C_X(\beta\Delta f) = \sum_{k=0}^{K-\beta-1} S_k S_{k+\beta}^* + \sum_{k=K-\beta}^{K-1} S_k S_{k+\beta-K}^* \quad (14)$$

This modified example utilizes this characteristic, and by changing the content of the symbols transmitted so that (1) the second-order frequency autocorrelation characteristic becomes close to 0, or alternatively, (2) conversely, the peak appears, given a predetermined frequency shift amount, an ID can be assigned to the group to which the data signal belongs so that the second-order frequency autocorrelation characteristics differ.

The subcarrier thus determined (the subcarrier that is used in the ID signal transmission) and the content of the ID signal that is transmitted using the subcarrier are stored in the ID signal storage 21 of the wireless transmitter 1 and the second or higher-order statistic properties database 32 of the wireless receiver 2 stores the feature quantity and the signal waveform of the frequency autocorrelation characteristic that appears.

Here, a specific example of the content of the ID signal content will be described. For example, a case where an ID signal is transmitted on five subcarriers may be considered. Here, the frequency characteristic of the signal that is transmitted on these five subcarriers is $S_k(f)$. Here, k is the index of the subcarrier that transmits an ID signal and k={0,1,2,3,4}. Further, these five subcarriers exist spaced apart at intervals of a predetermined frequency interval $\Delta f$. Here, when we assume that the frequency characteristic of the predetermined time signal $g_{id}(t)$ is $G_{id}(f)$, and the signal to be transmitted on the five subcarriers is given by $$\{S_0(f), S_1(f), S_2(f), S_3(f), S_4(f)\} = \{G_{id}(f), G_{id}(f), G_{id}(f), G_{id}(f), G_{id}(f)\} \quad (15)$$

then, $$C_X(\Delta f) = \sum_{k=0}^{3} S_k(f)S_{k+1}^*(f) = 4|G_{id}(f)|^2 \quad (16)$$

$$C_X(2\Delta f) = \sum_{k=0}^{2} S_k(f)S_{k+2}^*(f) = 3|G_{id}(f)|^2$$

$$C_X(3\Delta f) = \sum_{k=0}^{1} S_k(f)S_{k+3}^*(f) = 2|G_{id}(f)|^2$$

$$C_X(4\Delta f) = \sum_{k=0}^{0} S_k(f)S_{k+4}^*(f) = |G_{id}(f)|^2$$

Further, when the signal to be transmitted on the five subcarriers is given by $$\{S_0(f), S_1(f), S_2(f), S_3(f), S_4(f)\} = \{G_{id}(f), -G_{id}(f), G_{id}(f), G_{id}(f), G_{id}(f)\} \quad (17)$$

then, $$C_X(\Delta f) = \sum_{k=0}^{3} S_k(f)S_{k+1}^*(f) \quad (18)$$
$$= -|G_{id}(f)|^2 - |G_{id}(f)|^2 + |G_{id}(f)|^2 + |G_{id}(f)|^2$$
$$= 0$$

$$C_X(2\Delta f) = \sum_{k=0}^{2} S_k(f)S_{k+2}^*(f)$$
$$= |G_{id}(f)|^2 - |G_{id}(f)| + |G_{id}(f)|^2$$
$$= |G_{id}(f)|^2$$

$$C_X(3\Delta f) = \sum_{k=0}^{1} S_k(f)S_{k+3}^*(f)$$
$$= |G_{id}(f)|^2 - |G_{id}(f)|$$
$$= 0$$

$$C_X(4\Delta f) = \sum_{k=0}^{0} S_k(f)S_{k+4}^*(f)$$
$$= |G_{id}(f)|^2$$

Here, in order for the feature of the frequency autocorrelation of Equation (16) to appear, the content $S_k(t)$ and ($k=0, 1, 2, 3, 4$) of the ID signal of the five subcarriers, based on Equation (15), then becomes $$\{s_0(t), s_1(t), s_2(t), s_3(t), s_4(t)\} = \{g_{id}(t), g_{id}(t), g_{id}(t), g_{id}(t), g_{id}(t)\} \quad (19)$$

using a predetermined time signal waveform $g_{id}(t)$. Further, in order for the feature of the frequency autocorrelation of Equation (18) to appear, the content of the ID signal of the five subcarriers, based on Equation (17), then becomes:

$$\{s_0(t), s_1(t), s_2(t), s_3(t), s_4(t)\} = \{g_{id}(t), -g_{id}(t), g_{id}(t), g_{id}(t), g_{id}(t)\} \quad (20)$$

In addition, in the modified example, the wireless signal ID assigner 23 sets the content of the ID signal that is transmitted on the subcarriers used in the ID signal transmission as the content that is stored in the ID signal storage 21 and generates a transmission signal so that the modulated signal obtained through modulation of the data signal is transmitted on another subcarrier. Further, the wireless signal group discriminator 33 computes the frequency autocorrelation characteristic, compares the frequency autocorrelation characteristic obtained through computation with the second or higher-order statistic properties that are unique to each group stored in the second or higher-order statistic properties database 32, and, based on the comparison result, discriminates the group to which the received signal belongs. Here, the data demodulator 35 is able to estimate the transmission path of the received signal based on the ID signal waveform of the discriminated group that is stored in the second or higher-order statistic properties database 32 and perform highly accurate data demodulation by utilizing the ID signal waveform. Further, in this modified example, if the subcarrier for transmitting the ID signal and the subcarrier for transmitting the data signal are divided, the ID signal can be transmitted at the same time as the data signal is transmitted. However, if only the ID signal is transmitted on the subcarrier, IDs that are unique to a multiplicity of groups can be allocated.

In addition, in this modified example, the wireless signal ID assigner 23 are also able to set the signal that is transmitted on the subcarrier used for the ID signal transmission so that there is a concentration of signal energy in a predetermined frequency component. Specifically, a sine wave of a predetermined frequency is stored in the ID signal storage 21 and, as a result of the wireless signal ID assigner 23 making settings so that a stored sine wave of a predetermined frequency is transmitted on the subcarrier that is used for ID signal transmission, there is a concentration of signal energy in a predetermined frequency component within the subcarrier. As a result of the concentration of signal energy in the predetermined frequency component, second or higher-order statistic properties that are unique to the group to which the received signal belongs can be made to appear prominently and highly accurate ID detection can be carried out. Further, settings may also be made to transmit an ith transmission symbol of a digital signal instead of using the sine wave as the transmission signal $$\alpha(i) = e^{j2\pi ki} \quad (21).$$

Here, an example of transmission symbols when $k=\frac{1}{8}$ is shown in FIG. 14. The transmission symbols are the result of sampling and quantizing the sine wave signal, as for the case of the sine wave signal without the sampling and quantization, and there is a concentration of signal energy with respect to the predetermined frequency component. The ID signal storage 21 stores the transmission symbols that are generated in accordance with Equation (21) so that there is a concentration of signal energy in a predetermined frequency component for each subcarrier used in the ID signal transmission and the wireless signal ID assigner 23 generates a transmission signal by making settings so that the transmission symbols stored in the ID signal storage are transmitted on a subcarrier that is used for the ID signal transmission corresponding to the transmission symbols. By using such a signal after sampling and quantization, there is a concentration of signal energy in a predetermined frequency component using the same method as that for a signal other than the subcarrier used for the ID signal transmission and a signal that permits highly accurate ID detection can be generated. In addition, by using the signal after sampling and quantization, signal generation using an inverse Fourier transform is possible with an OFDM signal transmitter and a signal with a concentration of power at a predetermined frequency can be generated in a predetermined subcarrier. Further, in the case of an OFDM signal, by transmitting a signal such as the signal in Equation (21) as the value of the signal transmitted on the pilot subcarrier that is used for the transmission path estimation, an ID can be assigned to the signal without sacrificing the transmission efficiency.

Figure 10:
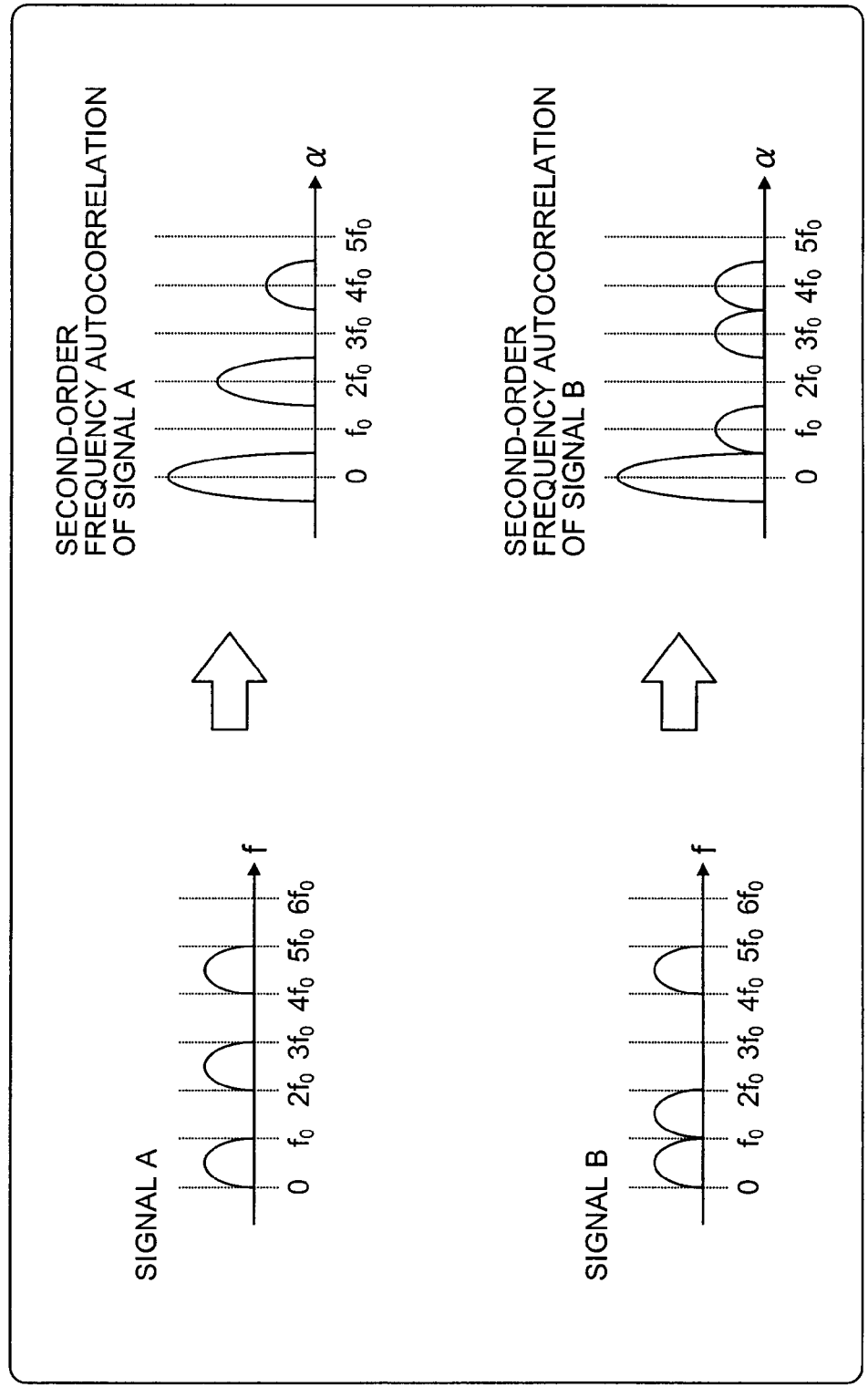
FIG. 10 shows an example of the relationship between the multicarrier transmission and a frequency autocorrelation characteristic.

A ninth modified example uses only some of the subcarriers during multicarrier transmission, that is, the symbol input to the unused subcarriers is zero (no input). Here, the ID signal storage 21 stores non-input subcarriers and '0' which is the input symbol of the non-input subcarrier. The wireless signal ID assigner 23 generates a transmission signal so that the signals of the non-input subcarriers stored in the ID signal storage 21 are '0' and so that a modulated signal is transmitted on subcarriers other than those designated as non-input subcarriers. In this case, as shown in FIG. 10, for example, because a correlation no longer appears between the signal transmitted on a non-input subcarrier and a signal that is transmitted on a subcarrier other than a non-input subcarrier, it is easy to approximate the second-order frequency autocorrelation characteristic in a partial frequency shift to zero. Hence, a transmission signal that represents various correlation appearance patterns can be easily generated through the selection of non-input subcarriers.

Using 802.11a wireless LAN, a short training signal is transmitted by using some subcarriers in order to establish synchronization and automatic frequency control and, after effecting frequency error compensation in order to establish symbol timing synchronization and establish carrier frequency synchronization by using short training, the MAC address of the signal transmission destination can be acquired by performing error correction decoding after FFT-processing a data portion of a wireless signal frame that is transmitted using all the subcarriers, whereby the group to which the received signal belongs can be obtained.

However, because this series of data demodulation processes is required, there is the problem that a long processing time is required to discriminate the group to which the data signal belongs. In contrast, according to the present invention, an ID is allocated to each group to which the wireless signal belongs by changing the placement of the subcarriers used in order to obtain different second or higher-order statistic properties and only these second or higher-order statistic properties are determined, IDs being discriminated based on the second or higher-order statistic properties thus determined. As a result, the group to which the received signal belongs can be discriminated at high speed. In this case, as per a conventional 802.11a wireless LAN, the short training symbols can be used in order to discriminate the group to which the received signal belongs at the same time as being utilized to establish symbol synchronization and carrier frequency synchronization.

A tenth modified example is such that an ID signal that fluctuates with respect to time is transmitted when the wireless transmitter 1 transmits a transmission signal. More specifically, the ID signal storage 21 stores an ID signal that adds second or higher-order statistic properties so that the frequency at which the power peak of the second or higher-order statistic properties appears changes according to the difference in the delay time. The wireless signal ID assigner 23 generates, using the ID signal stored in the ID signal storage 21, a transmission signal with second or higher-order statistic properties such that the frequency at which the power peak of the second or higher-order statistic properties appears varies according to the difference in the delay time. Further, the second or higher-order statistic properties database 32 of the wireless receiver 2 stores the feature quantities of the second or higher-order statistic properties that vary according to the delay time difference and the frequency. The wireless signal group discriminator 33 performs discrimination of the group to which the received signal belongs by computing the second or higher-order statistic properties of the received signal by varying the delay time difference and frequency and comparing the feature quantities of the second or higher-order statistic properties obtained through computation and the second or higher-order statistic properties stored in the second or higher-order statistic properties database 32.

Figure 11:
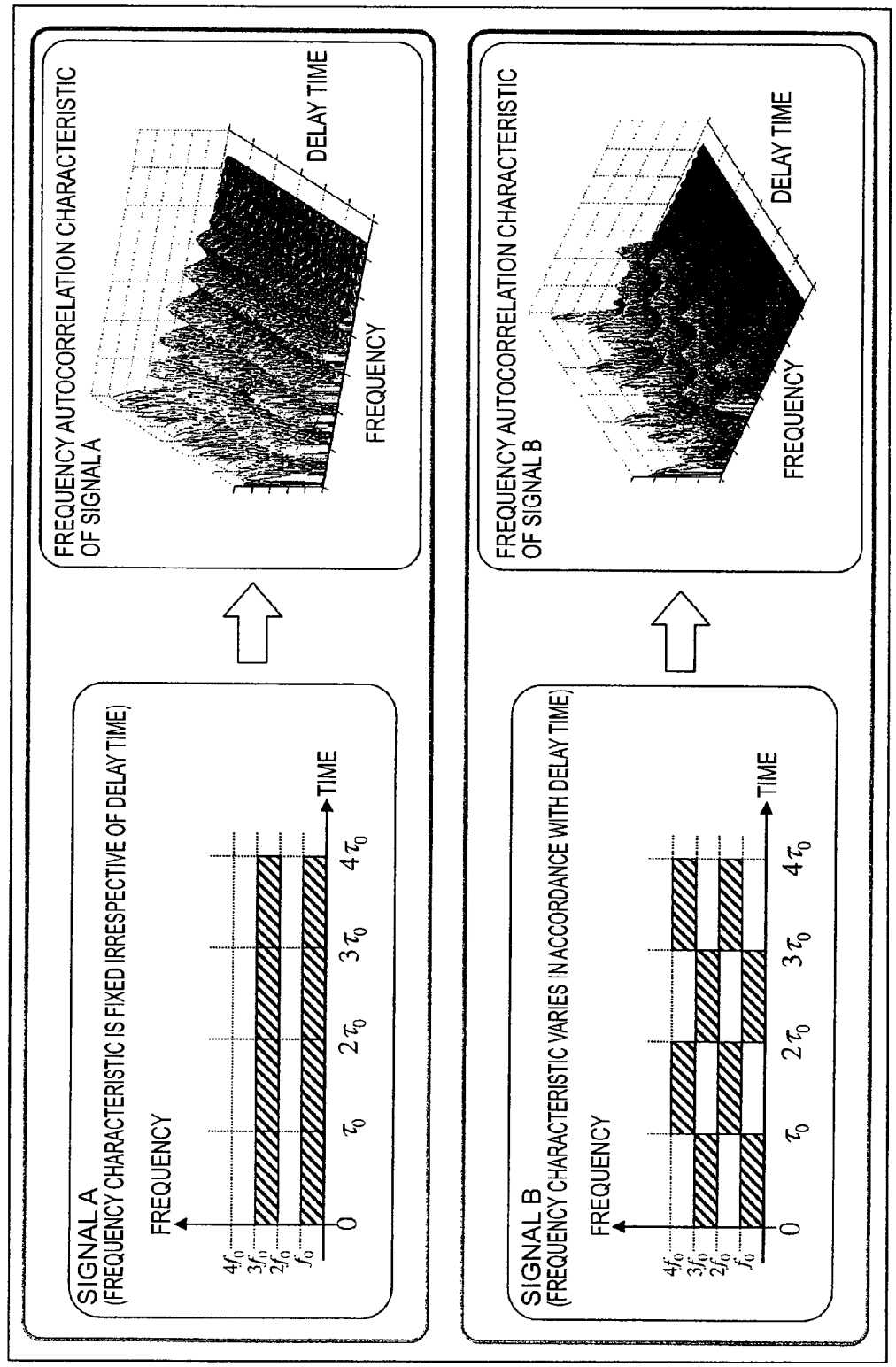
FIG. 11 shows an example of wireless signal ID allocation using second or higher-order frequency autocorrelation that considers the delay time.

A more specific example will be described hereinbelow. FIG. 11 represents the concept of a specific example. FIG. 11 represents the relationship between the ID assignment in cases where the wireless transmitter 1 performs multicarrier transmission and the second-order frequency autocorrelation characteristic and signal A shown in FIG. 11 is a transmission signal for which the subcarrier for transmitting the wireless signal does not depend on time but, rather, is fixed. Signal B is a transmission signal that is transmitted by changing the subcarrier for transmitting the wireless signal according to time. Here, the ID signal storage 21 of the wireless transmitter 1 stores information on the subcarriers that are not used in the data signal transmission, time information for when the subcarriers are not used, and transmission data '0' that is transmitted on a subcarrier that is not used to transmit the data signal. The wireless signal ID assigner 23 generates a transmission signal by inputting '0(non-input)' only for a designated time to the subcarriers that are not used for the data signal transmission and inputting a modulated signal that is obtained through modulation of the data signal to the other subcarriers.

Here, the frequency autocorrelation characteristic of signals A and B of FIG. 11 will be described. The frequency characteristic of a short segment of signal x(t) is $$X(f, t_0) = \int_{t_0}^{t_0+T_0} x(t)e^{-j2\pi f t} dt \tag{22}$$

and the second-order frequency characteristic that considers the time difference is defined by:

$$C_x(\alpha,\tau,t_0) = E_f[X(f,t_0)X^*(f+\alpha,t_0+\tau)] \tag{23}$$

Here, if we assume that the time interval $T_0$ of the interval integral in Equation (22) is $\tau_0$ and the frequency characteristic $X_A(f, t)$ of signal A is:

$$X_A(f, t) = \begin{cases} \sqrt{S/\tau_0} & 0 \le t \le M\tau_0 \text{ and} \\ & (0 \le f \le f_0 \text{ or } 2f_0 \le f \le 3f_0) \\ 0 & \text{otherwise,} \end{cases} \tag{24}$$

then, $$C_X(0, k\tau_0, t_0) = 2S/\tau_0 \tag{25}$$
$$C_X(2f_0, k\tau_0, t_0) = S/\tau_0$$
$$C_X(f_0, k\tau_0, t_0) = C_X(3f_0, k\tau_0, t_0) = 0$$

hold true for k=0,1,2, . . . ,M−1, and $0 \le t_0 \le (M-k)\tau_0$. It is clear from Equation (25) that the second-order frequency autocorrelation characteristic of signal A is not dependent on the time difference $k\tau_0$ and $$C_x(\alpha,0,t_0) = C_x(\alpha,\tau_0,t_0) = C_x(\alpha,2\tau_0,t_0) = \ldots = C_x(\alpha(M-1)\tau_0,t_0) \tag{26}$$

holds true for an arbitrary α. In contrast, if we assume that the frequency characteristic $X_B(f,t)$ of signal B is:

$$X_B(f, t) = \begin{cases} \sqrt{S/\tau_0} & (n-1)\tau_0 \leq t \leq n\tau_0 \text{ and } (0 \leq f \leq f_0 \text{ or } 2f_0 \leq f \leq 3f_0) \\ & n\tau_0 \leq t \leq (n+1)\tau_0 \text{ and } (f_0 \leq f \leq 2f_0 \text{ or } 3f_0 \leq f \leq 4f_0) \\ 0 & \text{otherwise} \end{cases} \quad (27)$$

for $n = 1, 2, \ldots, M - 1$, then:

$$\begin{aligned} &C_X(0, 2k\tau_0, t_0) = 2S/\tau_0, \\ &C_X(0, (2k+1)\tau_0, t_0) = 0, \\ &C_X(f_0, 2k\tau_0, t_0) = 0, \\ &C_X(f_0, (2k+1)k\tau_0, t_0) = 2S/\tau_0, \\ &C_X(2f_0, 2k\tau_0, t_0) = S/\tau_0, \\ &C_X(2f_0, (2k+1)\tau_0, t_0) = 0, \\ &C_X(3f_0, 2k\tau_0, t_0) = 0, \\ &C_X(3f_0, (2k+1)k\tau_0, t_0) = S/\tau_0, \end{aligned} \quad (28)$$

are valid for $k=0,1,2,\ldots,M-1$, and $0 \leq t_0 \leq (M-2k-1)\tau_0$. In other words, it can be seen that the second-order frequency autocorrelation characteristic of signal B fluctuates according to the time difference. Thus, it is clear that the second or higher-order statistic properties can vary according to the difference in the delay time (the manner in which the second or higher-order statistic properties appear changes as a result of considering the delay time). According to the modified example, by utilizing this characteristic and changing the frequency characteristic of the transmission signal using a fixed pattern according to time, the second or higher-order statistic properties are varied in accordance with the difference in the delay time. Accordingly, the assignment of an ID signal with unique second or higher-order statistic properties to groups to which the data signal possibly belongs is possible and the number of IDs that can be allocated can be increased.

An eleventh modified example uses a third or higher-order frequency autocorrelation characteristic as the second or higher-order statistic properties of the tenth modified example. Here, the ID signal storage 21 of the wireless transmitter 1 stores an ID signal that adds a frequency autocorrelation characteristic of a third or higher-order that is unique to the group to which the data signal belongs together with information on the subcarrier used for the transmission of the ID signal. The wireless signal ID assigner 23 generates a transmission signal such that the ID signal is transmitted using the subcarrier stored in the ID signal storage 21 and the modulated signal obtained through modulation of the data signal is transmitted on the other carriers. In addition, the second or higher-order statistic properties database 32 of the wireless receiver 2 stores a feature quantity of a third or higher-order frequency autocorrelation characteristic that is unique to the groups to which the signal possibly belongs. The wireless signal group discriminator 33 computes a third or higher-order frequency autocorrelation characteristic for the received signal that is received by the wireless receiver 31 and, by comparing the feature quantities of the third or higher-order frequency autocorrelation characteristic obtained through computation and the third or higher-order frequency autocorrelation characteristic that is unique to the groups to which the received signal stored in the second or higher-order statistic properties database 32 possibly belongs, the wireless signal group discriminator 33 discriminates the group to which the received signal belongs. Thus, by using a third or higher-order frequency autocorrelation characteristic, the effect of noise on the ID discrimination can be reduced and highly accurate ID discrimination is possible.

A twelfth modified example uses a cyclic autocorrelation characteristic as the second or higher-order statistic properties of the tenth modified example. Here, the ID signal storage 21 of the wireless transmitter 1 stores an ID signal to which a cyclic autocorrelation characteristic that is unique to the group to which the data signal belongs together with information on the subcarrier that is used for the transmission of the ID signal. The wireless signal ID assigner 23 generates the transmission signal such that the ID signal is transmitted on the subcarrier stored in the ID signal storage 21 and the modulated signal obtained through modulation of the data signal is transmitted on another carrier. Further, the second or higher-order statistic properties database 32 of the wireless receiver 2 stores a feature quantity of the cyclic autocorrelation characteristic that is unique to the group to which the received signal possibly belongs. The wireless signal group discriminator 33 computes a cyclic autocorrelation characteristic for the received signal that is received by the wireless signal receiver 31 and, by comparing the feature quantities of the cyclic autocorrelation characteristic obtained through computation and a cyclic autocorrelation characteristic that is unique to the groups to which the received signal possibly belongs which is stored in the second or higher-order statistic properties database 32, the wireless signal group discriminator 33 discriminates the group to which the received signal belongs. By using the cyclic autocorrelation in this way, there is no longer a need to perform a "Fourier transform of the received signal" which is required in a case where a frequency autocorrelation characteristic is employed. Hence, ID discrimination can be performed using a simple constitution.

A thirteenth modified example uses both a frequency autocorrelation characteristic and a cyclic autocorrelation characteristic as the second or higher-order statistic properties of the tenth modified example. In this case, the second or higher-order statistic properties database 32 of the wireless receiver 2 stores feature quantities of both the frequency autocorrelation characteristic and cyclic autocorrelation characteristic that are unique to the groups to which the received signal possibly belongs. The wireless signal group discriminator 33 computes both a frequency autocorrelation characteristic and a cyclic autocorrelation characteristic for the received signal that is received by the wireless signal receiver 31 and, by comparing the feature quantities of both the frequency autocorrelation characteristic and the cyclic auto correlation characteristic obtained through computation and a frequency autocorrelation characteristic and cyclic autocorrelation characteristic for each group stored in the second or higher-order statistic properties database 32, the wireless signal group discriminator 33 discriminates the group to which the received signal belongs. As a result, ID discrimination is also possible for a plurality of received signals with the same frequency autocorrelation characteristic and different cyclic autocorrelation characteristics, and the number of IDs can be secured with respect to an increase in the number of groups.

Figure 12:
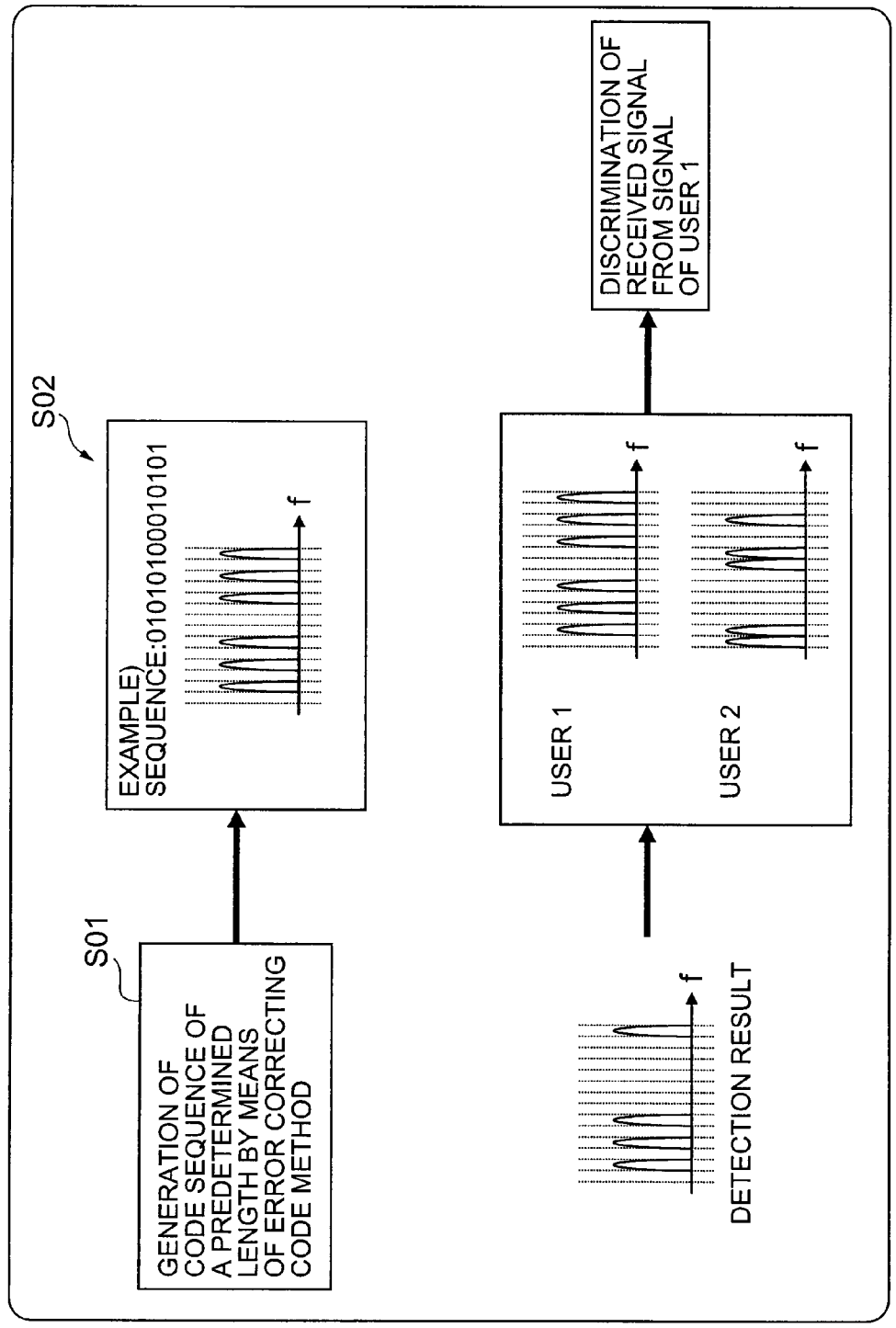
FIG. 12 shows an ID assignment method using a second or higher-order frequency autocorrelation using an error correcting code.

A fourteenth modified example is constituted to determine the frequency shift amount at which the peak of the second or higher-order statistic properties appears by matching the error correcting code to the feature quantities of the second or higher-order statistic properties in the wireless transceiver device and to determine the format of the ID signal in accordance with the position of this peak. FIG. 12 shows the concept of a method of matching the error correcting code to the frequency autocorrelation peak according to this modified example. In this modified example, a code sequence of a predetermined length is first generated by the error correcting code. Thereafter, the position of the peak (point of emergence) is determined by matching the code sequence with the peak of the second or higher-order statistic properties. The transmission signal format is determined by calculating back from Equation (8), for example, in accordance with the position of the peak thus determined.

More specifically, as shown in FIG. 12, the wireless transmitter 1 generates a code sequence of a predetermined length by means of an error correcting code (S01), determines the point of emergence of the peak by matching the code sequence with the peak of the second or higher-order statistic properties, and determines the ID signal from the position of the point of emergence of this peak (S02), before storing the ID signal thus determined in the ID signal storage 21 of the wireless transmitter 1. The wireless signal ID assigner 23 associates (adds, for example) the ID signal stored in the ID signal storage 21 with the modulated signal obtained by modulating the data signal in order to generate a transmission signal. As a result, the points of emergence of the peak for the allocated ID signals are different and the correlation between the ID signals is weak (the mutual correlation is weak as per the correlation between the ID signal of user 1 and the ID signal of user 2 in FIG. 12, for example). Accordingly, the ID discrimination error after pattern matching can be reduced.

Further, an ID is allocated simply according to the existence of a second or higher-order statistic properties peak by using two values of 0 and 1 as the error correcting code in the fourteenth modified example. However, the size of the second or higher-order statistic properties (the power thereof) may also be allocated to multivalued error correcting code. In this case, even when the number of groups increases as a result of correspondence with multivalued error correcting code, the number of IDs can be secured and ID discrimination errors can be reduced.

Moreover, according to the fourteenth modified example, information may also be provided for the phase of the second or higher-order statistic properties. In this case, by allocating different IDs according to the phase of the second or higher-order statistic properties, the number of IDs that can be allocated can be increased. The method of providing information on the phases is particularly effective because the relative values of the phases do not vary with frequency in a flat phasing environment.

The disclosure of Japanese Patent Application No. 2006-208679 filed on Jul. 31, 2006 including specification, drawings and claims and the disclosure of Japanese Patent Application No. 2006-286741 filed on Oct. 20, 2006 including specification, drawings and claims are incorporated herein by reference in its entirety.

What is claimed is:

1. A wireless transmitter, comprising:
ID signal storage module for storing an ID signal that identifies a group to which a data signal to be transmitted belongs and provides, for each group, second or higher-order statistic properties unique to each group;
modulator for modulating the data signal;
wireless signal ID assignment module for associating the modulated signal modulated by the modulator with the ID signal that is stored in the ID signal storage module, and for generating a signal to be transmitted, by assigning second or higher-order statistic properties that correspond with the ID signal to the modulated signal that is associated with the ID signal; and
wireless signal transmission module for wirelessly transmitting the signal that is generated by the wireless signal ID assignment module.

2. The wireless transmitter according to claim 1, wherein the wireless signal ID assignment module assigns the second or higher-order statistic properties corresponding with the ID signal to the modulated signal by adding the ID signal to the modulated signal.

3. The wireless transmitter according to claim 1, wherein the wireless signal ID assignment module assigns the second or higher-order statistic properties corresponding with the ID signal to the modulated signal by multiplying the ID signal by the modulated signal.

4. The wireless transmitter according to claim 1, wherein the wireless transmitter is a wireless transmitter that transmits a signal by means of multicarrier transmission that uses a plurality of subcarriers;
the ID signal storage module stores an ID signal for which the transmission content on each subcarrier is determined so that the second or higher-order statistic properties unique to the group appear in accordance with the group to which the transmitted data signal belongs; and
the wireless signal ID assignment module generates the signal to be transmitted by setting the transmission content of each subcarrier on the basis of the ID signal stored in the ID signal storage module.

5. The wireless transmitter according to claim 1, wherein the wireless transmitter is a wireless transmitter that transmits a signal by means of multicarrier transmission using a plurality of subcarriers;
the ID signal storage module stores, as the ID signal, a sine wave of a predetermined frequency or a transmission symbol obtained by sampling and quantizing a signal of the sine wave, which corresponds to the group to which the data signal to be transmitted belongs; and
the wireless signal ID assignment module generates the signal to be transmitted by making settings so that the sine wave or the transmission symbol stored in the ID signal storage module are transmitted by the subcarrier used for the ID signal transmission.

6. The wireless transmitter according to claim 1, wherein the wireless transmitter is a wireless transmitter that transmits a signal by means of multicarrier transmission that employs a plurality of subcarriers;
the ID signal storage module stores an ID signal for which the subcarrier used for communication is determined from among all the subcarriers in accordance with the group to which the data signal to be transmitted belongs; and
the wireless signal ID assignment module generates the signal to be transmitted that uses only a predetermined subcarrier determined by the ID signal stored in the ID signal storage module.

7. The wireless transmitter according to claim 1, wherein the ID signal storage module stores an ID signal that is determined so that a change that is unique to the group to which the data signal belongs arises as a result of the delay time in the second or higher-order statistic properties obtained from the data signal to be transmitted and a data signal to be transmitted with a predetermined delay time; and
the wireless signal ID assignment module generates the signal to be transmitted by assigning second or higher-order statistic properties in which the change unique to the group arises, to the modulated signal associated with the ID signal, on the basis of the ID signal stored in the ID signal storage module.

8. The wireless transmitter according to claim 1, wherein the ID signal storage module determines a frequency and delay time difference on the basis of an error correcting code by matching a sequence that is obtained using the error correcting code with a frequency and delay time difference by which the power peak for the second or higher-order statistic properties is obtained, and stores an ID signal so that the second or higher-order statistic properties determined by matching an emergence pattern of the power peak of the second or higher-order statistic properties with the error correcting code are made to appear in the signal to be transmitted; and
the wireless signal ID assignment module generates the signal to be transmitted on the basis of an ID signal that is stored in the ID signal storage module.

9. A wireless communication system that is constituted comprising a wireless transmitter and a wireless receiver that exists in the vicinity of the wireless transmitter, wherein
the wireless transmitter comprises:
ID signal storage module for storing an ID signal that identifies a group to which a data signal to be transmitted belongs and provides, for each group, second or higher-order statistic properties unique to each group;
modulator for modulating the data signal;
wireless signal ID assignment module for associating the modulated signal modulated by the modulator with the ID signal that is stored in the ID signal storage module, and for generating a signal to be transmitted, by assigning second or higher-order statistic properties that correspond with the ID signal to the modulated signal that is associated with the ID signal; and
wireless signal transmission module for wirelessly transmitting the signal that is generated by the wireless signal ID assignment module, and wherein
the wireless receiver comprises:
a second or higher-order statistic properties database that stores, for each group, second or higher-order statistic properties unique to each of all groups to which a signal to be received possibly belongs;
wireless signal reception module that wirelessly receives an incoming signal; and
wireless signal group discrimination module that determines the second or higher-order statistic properties pertaining to the signal received by the wireless signal reception module and, discriminates the group to which the received signal belongs, by comparing the second or higher-order statistic properties thus determined with second or higher-order statistic properties for each group stored in the second or higher-order statistic properties database.

10. A wireless signal control method, comprising:
an ID signal storage step in which, prior to communication, a wireless transmitter stores an ID signal that identifies a group to which a data signal to be transmitted belongs and provides, for each group, second or higher-order statistic properties unique to each group;
a data modulation step in which the wireless transmitter modulates the data signal;
a wireless signal ID assignment step in which the wireless transmitter associates the modulated signal modulated in the data modulation step with the ID signal stored in the ID signal storage step and, generates a signal to be transmitted, by assigning second or higher-order statistic properties corresponding with the ID signal to the modulated signal associated with the ID signal, and
a wireless signal transmission step in which the wireless transmitter wirelessly transmits the signal generated in the wireless signal ID assignment step.

11. A wireless signal control method of a wireless communication system that is constituted comprising a wireless transmitter and a wireless receiver that exists in the vicinity of the wireless transmitter,
the method comprising:
an ID signal storage step in which, prior to communication, a wireless transmitter stores an ID signal that identifies a group to which a data signal to be transmitted belongs and provides, for each group, second or higher-order statistic properties unique to each group;
a data modulation step in which the wireless transmitter modulates the data signal;
a wireless signal ID assignment step in which the wireless transmitter associates the modulated signal modulated in the data modulation step with the ID signal stored in the ID signal storage step and, generates a signal to be transmitted, by assigning second or higher-order statistic properties corresponding with the ID signal to the modulated signal associated with the ID signal, and
a wireless signal transmission step in which the wireless transmitter wirelessly transmits the signal generated in the wireless signal ID assignment step;
a second or higher-order statistic properties storage step in which, prior to communication, a wireless receiver stores, for each group, second or higher-order statistic properties that are unique to each of all groups to which a signal to be received possibly belongs;
a wireless signal reception step in which the wireless receiver wirelessly receives an incoming signal; and
a wireless signal group discrimination step in which the wireless receiver determines the second or higher-order statistic properties pertaining to the signal received in the wireless signal reception step and, discriminates the group to which the received signal belongs, by comparing the second or higher-order statistic properties thus determined with second or higher-order statistic properties for each group stored in the second or higher-order statistic properties storage step.

* * * * *